United States Patent
Illsley et al.

(10) Patent No.: US 11,267,977 B2
(45) Date of Patent: Mar. 8, 2022

(54) UV-CURABLE COMPOSITIONS COMPRISING ACYLPHOSPHINE OXIDE PHOTOINITIATORS

(71) Applicant: SUN CHEMICAL CORPORATION, Parsippany, NJ (US)

(72) Inventors: Derek Ronald Illsley, Bath (GB); Shaun Lawrence Herlihy, Glastonbury (GB)

(73) Assignee: Sun Chemical Corporation, Parsippany, NJ (US)

( * ) Notice: Subject to any disclaimer, the term of this patent is extended or adjusted under 35 U.S.C. 154(b) by 87 days.

(21) Appl. No.: 16/634,793

(22) PCT Filed: Aug. 6, 2018

(86) PCT No.: PCT/US2018/045316
§ 371 (c)(1),
(2) Date: Jan. 28, 2020

(87) PCT Pub. No.: WO2019/032425
PCT Pub. Date: Feb. 14, 2019

(65) Prior Publication Data
US 2021/0115273 A1    Apr. 22, 2021

Related U.S. Application Data

(60) Provisional application No. 62/543,505, filed on Aug. 10, 2017.

(51) Int. Cl.
| | |
|---|---|
| *G01D 11/00* | (2006.01) |
| *B41J 2/17* | (2006.01) |
| *B41J 2/01* | (2006.01) |
| *C08F 2/46* | (2006.01) |
| *C08F 2/50* | (2006.01) |
| *C08G 61/04* | (2006.01) |
| *C09D 11/101* | (2014.01) |
| *B41J 11/00* | (2006.01) |
| *B41M 5/00* | (2006.01) |
| *B41M 5/50* | (2006.01) |
| *C09D 11/107* | (2014.01) |
| *C09D 11/38* | (2014.01) |

(52) U.S. Cl.
CPC .......... *C09D 11/101* (2013.01); *B41J 11/002* (2013.01); *B41M 5/0023* (2013.01); *B41M 5/50* (2013.01); *C09D 11/107* (2013.01); *C09D 11/38* (2013.01)

(58) Field of Classification Search
CPC ..... C09D 11/38; C09D 11/101; C09D 11/107; B41M 5/0023; B41M 5/50; B41J 11/002

USPC ...... 347/100, 95, 84, 1; 522/71, 189, 184, 6, 522/1; 520/1
See application file for complete search history.

(56) References Cited

U.S. PATENT DOCUMENTS

| | | | |
|---|---|---|---|
| 6,093,455 | A | 7/2000 | Kamen et al. |
| 6,313,188 | B1 | 11/2001 | Takahashi |
| 8,785,515 | B2 | 7/2014 | Herlihy et al. |
| 9,175,098 | B2 | 11/2015 | Nielsen et al. |
| 9,394,461 | B2 | 7/2016 | Croutxe-Barghorn et al. |
| 9,550,898 | B2 | 1/2017 | Loccufier et al. |
| 9,714,355 | B2 | 7/2017 | Illsley et al. |
| 2008/0213550 | A1 | 9/2008 | Watanabe |
| 2008/0221234 | A1 | 9/2008 | Illsley et al. |
| 2010/0297542 | A1 | 11/2010 | Hayoz et al. |
| 2011/0074897 | A1 | 3/2011 | Araki |
| 2012/0287213 | A1* | 11/2012 | Engel ................. C09D 11/101 347/102 |
| 2017/0240659 | A1* | 8/2017 | Norcini .................. C07F 9/36 |
| 2018/0272595 | A1* | 9/2018 | Yudovin-Farber .... B29C 64/106 |

FOREIGN PATENT DOCUMENTS

| | | |
|---|---|---|
| CN | 102492330 A | 6/2012 |
| CN | 102964968 A | 3/2013 |
| EP | 1 767 600 A2 | 3/2007 |
| EP | 2 228 416 A1 | 9/2010 |
| EP | 2 302 007 A1 | 3/2011 |
| EP | 2 604 663 A1 | 6/2013 |
| EP | 2 607 433 A1 | 6/2013 |
| EP | 2 669 342 A1 | 12/2013 |
| EP | 2 832 805 A1 | 2/2015 |
| EP | 3 006 515 A1 | 4/2016 |
| WO | WO 00/31030 A1 | 6/2000 |
| WO | WO 2006/056541 A1 | 6/2006 |

(Continued)

OTHER PUBLICATIONS

Extended European Search Report issued in counterpart EP Application No. 18844519.1, dated Mar. 9, 2021.

(Continued)

*Primary Examiner* — Jessica Whiteley
(74) *Attorney, Agent, or Firm* — Marian E. Fundytus; Ostrolenk Faber LLP.

(57) ABSTRACT

The present invention is drawn to UV-curable ink and coating compositions comprising acylphosphine oxide photoinitiators and acids. The acids may be inorganic or organic acids, or acids generated by a photoacid generator during UV-cure. Incorporation of the acids into the UV-curable ink and coating compositions results in a reduction of migratable aldehydes that are produced by acylphosphine oxide photoinitiators during UV-cure. The ink and coating compositions are particularly useful for use in applications N that require low migration of low molecular weight materials, such as, for example, food packaging.

21 Claims, No Drawings

(56) References Cited

FOREIGN PATENT DOCUMENTS

| WO | WO 2013/128452 A1 | 9/2013 |
| WO | WO 2014/126720 A1 | 8/2014 |
| WO | WO 2014/184548 A1 | 11/2014 |
| WO | WO 2015/181332 A1 | 12/2015 |
| WO | WO 2017/048710 A1 | 3/2017 |

OTHER PUBLICATIONS

International Search Report issued in International Application No. PCT/US2018/045316, dated Oct. 24, 2018.
Written Opinion of the International Searching Authority issued in International Application No. PCT/US2018/045316, dated Oct. 24, 2018.
International Preliminary Report on Patentability (Chapter II of the Patent Cooperation Treaty) issued in International Application No. PCT/US2018/045316, dated Sep. 3, 2019.
E. Bellotti et al., *Radtech Report*, Issue 1 (2013), p. 13.

\* cited by examiner

UV-CURABLE COMPOSITIONS COMPRISING ACYLPHOSPHINE OXIDE PHOTOINITIATORS

CROSS REFERENCE TO RELATED APPLICATIONS

The present application is a § 371 National Phase application based on PCT/US2018/045316 filed Aug. 6, 2018, which claims the benefit of U.S. Provisional Application No(s). 62/543,505, filed Aug. 10, 2017 the subject matter of each of which is incorporated by reference in their entirety.

FIELD OF THE INVENTION

The present invention is related to UV-curable ink and coating compositions that are suitable for applications that require reduced migration of contaminants from the cured coating. Advantageously, the amount of aldehyde produced by an acylphosphine oxide during UV-cure of the ink or coating compositions is reduced by incorporation of an acid into the compositions.

BACKGROUND

Energy curable inks and coatings are often used in the printing of food packaging, pharmaceutical packaging, personal care and household packaging, display boards in supermarkets, etc. In all of these applications, it is advantageous that the energy cured ink or coating contains minimal amounts of uncured material that could leach ("migrate") out of the ink/coating into the surrounding environment, thereby causing unwanted contamination of the packaged product. This is of particular concern for food packaging where any contamination of the packaged food from undesirable, migratable, ink components should be minimized.

Where acylphosphine oxide photoinitiators are used, including those such as bis(2,4,6-trimethylbenzoyl)-phenylphosphineoxide, which have high migration limits, an issue for low migration printing or coating is the production of photodecomposition products from the photoinitiator, and especially aldehydes. In the case of bis(2,4,6-trimethylbenzoyl)-phenylphosphineoxide, the decomposition product 2,4,6-trimethylbenzaldehyde (i.e. mesitaldehyde) is of particular concern as its migration into foods should be limited to less than 10 ppb. Therefore, the use of acylphosphine oxides for applications that require low migration is limited.

Use of high amounts of monofunctional monomers is also a problem in applications that require cured inks and coatings having low migration of contaminants. There are often residual, uncured, monofunctional monomers present after an ink or coating is cured. These residual monomers can migrate, contaminating the product.

CN 102964968, CN 102492330, and U.S. Pat. No. 9,394,461 all describe dual cure compositions comprising both free radical and cationic photoinitiators, where the cationic photoinitiator is used to initiate a sol-gel reaction. However, these compositions contain high amounts of monofunctional monomers, and would therefore not be suitable for applications requiring low migration of residual ink components.

EP 2302007 and EP 3006515 disclose UV-curable inkjet compositions comprising acylphosphine oxide and ketosulphone photoinitiators. However, both show that using acylphosphine oxide and ketosulphone photoinitiators can have detrimental effects on the compositions. Furthermore, the compositions would not be suitable for low migration applications due to the high amounts of monofunctional monomers.

U.S. Pat. Nos. 9,714,355 and 9,550,898 describe low migration UV-curable inkjet compositions comprising acylphosphine oxide photoinitiators. The compositions preferably do not contain cationic photoinitiators. Although U.S. Pat. No. 9,714,355 shows reduced amounts of mesitaldehyde migration, the testing methods do not follow current guidelines, and thus the levels are likely higher than reported. U.S. Pat. No. 9,550,898 does not measure mesitaldehyde migration.

There remains a need for energy curable compositions that comprise acylphosphine oxide photoinitiators, that have low levels of migratable decomposition products, particularly aldehydes.

SUMMARY OF THE INVENTION

The present invention provides UV-curable ink and coating compositions comprising acylphosphine oxide photoinitiators, that have reduced amounts of photodecomposition products, particularly aldehydes, produced by the acylphosphine oxide photoinitiators during curing of the ink and coating compositions. It has surprisingly been found that including an acid in the ink and coating compositions can effectively reduce the amount of aldehyde photodecomposition products.

In a particular aspect, the present invention provides an energy curable ink or coating composition, comprising:
  a) one or more photopolymerizable monomers and/or oligomers;
  b) one or more acylphosphine oxide photoinitiators; and
  c) one or more acids.

In certain embodiments, the compositions of the invention comprise at least one organic acid.

In other embodiments, the acid in the compositions is derived from one or more photoacid generators.

In another aspect, the present invention provides a method for preparing a printed substrate having a reduced amount of extractable materials, comprising applying one or more ink or coating compositions of the invention to the substrate, and curing the ink or coating compositions under the actions of UV radiation.

In yet other embodiments, the present invention provides printed substrates and articles comprising the ink and coating compositions of the invention.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

Disclosed are UV-curable compositions, suitable for low migration printing and coating applications, comprising acylphosphine oxide photoinitiators and acids, where the acid may optionally be generated from a photo-acid generator. Where the acid is produced by a photo-acid generator, cationic photoinitiators are a preferred class. Ketosulphone photoinitiators may also be used as the photo-acid generator.

The present invention provides ink and coating compositions having significantly reduced aldehyde photocomposition products that are produced by acylphosphine oxide photoinitiators during curing of the ink and coating compositions. The inventors have surprisingly found that the amount of aldehyde photodecomposition products produced by acylphosphine oxide photoinitiators can be reduced dramatically by the introduction of acid into the composition. The acid can be introduced into the composition by adding acids, preferably organically modified acids. The acid can also be produced in-situ by incorporating cationic photoinitiators, or ketosulphone photoinitiators into the compositions.

In particular, the present invention can result in a dramatic lowering of the amount of aldehydes, such as mesitaldehyde (trimethylbenzaldehyde), produced by such acylphosphine oxide photoinitiators. Mesitaldehyde is a low molecular weight compound (148 g/mol) that is highly prone to migration. The inventors have found that mesitaldehyde is a species that migrates readily in set-off migration studies into plastic films, such as low density polyethylene (LDPE), and, as such, with a migration limit of 10 ppb into foodstuffs, it poses a significant risk with respect to contamination of packaged products, especially foodstuffs. Thus, any means by which the amount of mesitaldehyde, or other aldehyde, produced during UV-curing from acylphosphine oxide photinitiators can be reduced would be highly desirable.

In a particular aspect, the present invention provides an energy curable ink or coating composition, comprising:

a) one or more photopolymerizable monomers and/or oligomers;
b) one or more acylphosphine oxide photoinitiators; and
c) one or more acids.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the terms "(meth)acrylate" or "(meth) acrylic acid" include both acrylate and methacrylate compounds, and both acrylic acid and methacrylic acid.

As used herein, "monofunctional" means having one functional group.

As used herein, "multifunctional" means having two or more functional groups. A multifunctional monomer, for e.g., can be a di-functional, tri-functional, tetra-functional or have a higher number of functional groups. The two or more functional groups can be the same or different.

As used herein, the terms "monomer," "monomers," and "monomers and/or oligomers" are intended to include both monomers and oligomers, or mixtures thereof.

As used herein, a "photo-acid generator" or "PAG" is any compound that can be converted into a strong acid by photolysis. In the case of cationic photoinitiators and ketosulphone photoinitiators, which are preferred PAGs used in the present invention, this is achieved by a photodissociation process.

As used herein, a "sulphonic" acid is an acid comprising an $S(=O)_2$—OH group.

As used herein, a "phosphoric" acid is an acid comprising an $O=P$—$(OH)_3$ group.

As used herein, a "phosphonic" acid is an acid comprising an $O=PH$—$(OH)_2$ group.

As used herein, the term "alkyl" refers to straight chain and branched saturated non-cyclic hydrocarbons, having from 1 to 22 carbon atoms. Representative straight chain alkyl groups include methyl, -ethyl, -n-propyl, -n-butyl, -n-pentyl, -n-hexyl, n-heptyl, n-octyl, n-nonyl, n-decyl, and n-amyl. Representative branched alkyl groups include isopropyl, sec-butyl, isobutyl, tert-butyl, isopentyl, neopentyl, 1-methylbutyl, 2-methylbutyl, 3-methylbutyl, 1, 1-dimethylpropyl, 1,2-dimethylpropyl, 1-methylpentyl, 2-methylpentyl, 3-methylpentyl, 4-methylpentyl, 1-ethylbutyl, 2-ethylbutyl, 3-ethylbutyl, 1, 1-dimethylbutyl, 1,2-dimethylbutyl, 1,3-dimethylbutyl, 2,2-dimethylbutyl, 2,3-dimethylbutyl, 3,3-dimethylbutyl, 5-methylhexyl, 6-methylheptyl, 2-ethylhexyl, and the like.

As used herein, the term "aryl" means an aromatic carbocyclic ring containing 6 to 22 carbon atoms, including both mono-, bi-, and tricyclic ring systems. Representative aryl groups include -indenyl, -phenyl, -naphthyl, anthracenyl and the like.

As used herein, "optionally substituted" refers to a group that is either unsubstituted or substituted. Substitutions include any moiety that is suitable.

As used herein, the terms "inks and coatings," "inks," "compositions," "fluids" and the like are used interchangeably.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source, or other source of actinic radiation, may be used to cure compositions prepared according to the current invention.

As used herein, "low migration" refers to the level of contamination of any packaged produce or product being less than 50 parts per billion (ppb) of any particular uncured monomer that may leach out of the ink or coating once it is cured on the substrate. 'Low migration' further means that contamination by photoinitiator residues and decomposition products should also be less than 50 ppb, or less than the specific migration limit (SML) existing for any specific photoinitiator. The methods of the current invention lend themselves to applications where higher conversion of monomer via energy curing, and reduced amounts of photodecomposition products, is preferable. Such applications include the printing of food packaging, pharmaceutical packaging, personal care and household packaging, display boards in supermarkets, etc. In all these applications it is advantageous that the energy-cured ink, or coating, contains minimal amounts of uncured material and photodecomposition products that could leach ('migrate') out of the ink into the surrounding environment thereby causing unwanted contamination. This is of particular concern for food packaging where any contamination of the packaged food from undesirable, migratable, ink components should be minimized. Therefore, any means to increase the conversion of such low molecular weight, low functionality monomers, and decrease the amount of photodecomposition products, during energy curing would be advantageous for the aforementioned sensitive printing applications. This is achieved by the compositions of the present invention, and the methods of printing energy curable ink and coating compositions according to the current invention.

As used herein, the term "article" or "articles" means a substrate or product of manufacture. Examples of articles include, but are not limited to: substrates such as paper, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

Compositions

The surprising finding that the incorporation of acids into UV-curing compositions comprising acylphosphine oxide photoinitiators can reduce the amount of aldehydes produced, such as mesitaldehyde, has not been previously reported in the literature. Therefore, an aspect of the present invention is not merely compositions comprising the combination of acylphosphine oxide photoinitiators with acids, but, perhaps more importantly, the extent by which the amount of mesitaldehyde, or other aldehydes, produced as a photodecomposition product of these types of photoinitiators is reduced. Thus, the present invention also encompasses that the amount of mesitaldehyde (or other aldehydes) produced by acylphosphine oxide photoinitiators would preferably be lowered by at least 10%, more preferably 20% or more, compared to compositions that contain acylphosphine oxides, but no acids.

The nature of the acid has an impact on this lowering of the amount of mesitaldehyde produced as a photodecomposition by-product of photoinitiation. Especially preferred acids are inorganic and organic derivatives of phosphoric acid, phosphonic acid, and sulphonic acid, although it should be understood that any inorganic or organic acid able to induce the required lowering of the generation of mesitaldehyde or other aldehyde is encompassed by the present invention.

In some embodiments, it is preferred that an acid is not added to a UV-curable composition containing acylphosphine oxide photoinitiators. A particularly surprising finding is that the use of cationic photoinitiators to produce "in-situ" UV-generated acids is a particularly effective means of producing the acid that enables the lowering of the mesitaldehyde (or other aldehydes) produced during UV-cure from acylphosphine oxide photoinitiators. This has advantages in instances where the presence of acid could have an impact on, for instance, the long-term shelf-life of UV-curable compositions. A feature of many commercial cationic photoinitiators is that under the action of UV-light, they produce very strong inorganic acids, such as hexafluorophosphoric acid. Indeed, the inventors have found that the phosphoric acid and phosphinic acid derivatives, including organic derivatives, are especially effective in lowering the amount of mesitaldehyde, or other aldehyde, produced by acylphosphine oxide photoinitiators during UV-cure.

If we consider the photodecomposition of bis(2,4,6-trimethylbenzoyl)-phenylphosphineoxide, the product of concern is the trimethyl benzoyl radical.

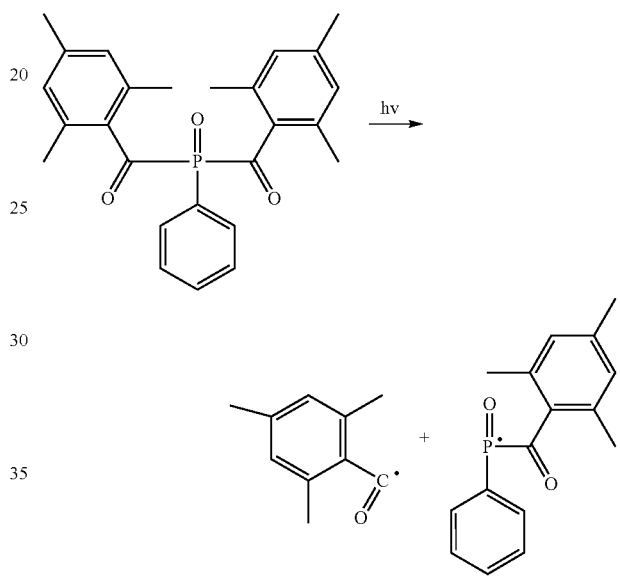

The trimethyl benzoyl radical can: (1) initiate polymerization; or (2) abstract a proton from a suitable source to produce mesitaldehyde. It is also possible for the trimethyl benzoyl radical to react with oxygen, and undergo further reactions to form trimethylbenzoic acid. The inventors have found that mesitaldehyde is highly prone to set-off migration, whereas trimethylbenzoic acid is much less so. Thus, any process which can reduce the amount of mesitaldehyde produced by this photoinitiator would be highly desirable for applications requiring the use of such photoinitiators in sensitive printing and coating applications, such as the printing of food packaging. It should be noted that the present invention covers both pigmented and non-pigmented compositions, and is particularly suited to inkjet, flexographic, gravure, and offset printing, although other printing/coating processes are covered by the present invention. Printing processes include, but are not limited to, digital printing, inkjet printing, flexographic printing, offset printing, silk screen printing, lithographic printing, gravure printing, and letter press printing.

No prior art has been identified which discloses the important finding that the presence of acids can limit the amount of mesitaldehyde, or other aldehydes, produced from acylphosphine oxide photoinitiators during UV-cure. There are a number of instances in the prior art disclosing compositions comprising free radical and cationic photoinitiators, where the free radical photoinitiator component can comprise acylphosphine oxide photoinitiators. However, this was in the context of dual-cure hybrid compositions, containing both free radically curable and cationically curable components. The cationic photoinitiators are generally used to initiate a sol-gel reaction.

Although not cationic photoinitiators as such, ketosulphone free radical photoinitiators produce sulpho radicals upon exposure to UV radiation, which are acidic in nature, and which may form sulphonic acids. An example of such a photoinitiator is 1-{4-[(4-benzoylphenyl)sulfanyl]phenyl}-2-methyl-[(4-methylphenyl)sulfonyl]propan-1-one (CAS NO:272460-97-6). Other suitable ketosulphone photoinitiators are those described in EP2302007, which are hereby incorporated by reference. Bellotti and colleagues describe how, after beta cleavage, ketosulphone photoinitiators can undergo a disproportionation reaction to produce para-toluene sulphonic acid (E. Bellotti et. al., *Radtech Report*, Issue 1 (2013), p. 13). As well as the parent ketosulpone photoinitiators, the present invention also covers the sulphonic acids that might be formed during the photoinitiation process.

The present invention covers the use of any acylphosphine oxide photoinitiator, including those revealed in WO 2006/056541, WO 2015/181332, and U.S. Pat. No. 9,175,098. As such, polymerisable, polymeric, and multifunctional types are covered by the present invention. A particularly preferred photoinitiator is the commercially available bis(2,4,6-trimethylbenzoyl)-phenylphosphine oxide. However, it should be understood that the present invention encompasses any acylphosphine oxide photoinitiator, including mono- and bisacylphosphine oxides.

It is clear from the analysis of the identified prior art that the use of inorganic or organic acids, whether they be incorporated directly into the compositions or produced by the action of UV light on cationic photoinitiators or other photoacid generators, to reduce the amount of migratable decomposition products, particularly aldehydes, from acylphosphine oxide photoinitiators has not been established. This is a desirable feature for UV-curable compositions comprising acylphosphine oxide photoinitiators which are intended to be used in applications requiring low migration. In printing and coating applications requiring low migration it is highly desirable to limit the amount of low molecular weight chemicals that might migrate from a UV-cured film and cause undesirable contamination of the surrounding environment, or of any packaged product.

One aspect that limits the use of acylphosphine oxide photoinitiators, even in instances where the parent photoinitiator has a high migration limit, is that certain decomposition products, particularly aldehydes, have low migration thresholds. In the case of bis(2,4,6-trimethylbenzoyl)-phenylphosphineoxide, the specific migration limit (SML) for this chemical, that is the maximum acceptable level of contamination of any foodstuff, is 3300 ppb. However, the principal decomposition product most commonly associated with bis(2,4,6-trimethylbenzoyl)-phenylphosphineoxide is mesitaldehyde, which has a migration limit of only 10 ppb. Mesitaldehyde, although being found in certain herbs and spices, has not been fully tested toxicologically, thus accounting for its 10 ppb migration limit in Europe. As well as the low migration limit associated with mesitaldehyde, it also has a strong, bitter, almond-like odor. So, any means of limiting its production by bis(2,4,6-trimethylbenzoyl)-phenylphosphineoxide and other acylphosphine oxide photoinitiators in UV-curing applications would be very favorable.

The closest prior art identified, EP 3006515, describes UV-curable inkjet compositions comprising bis(2,4,6-trimethylbenzoyl)-phenylphosphineoxide and the ketosulphone photoinitator 1-{4-[(4-benzoylphenyl)sulfanyl]phenyl}-2-methyl-2-[(4-methylphenyl)sulfonyl]propan-1-one. However, the relationship between a photogenerated acid and the capacity for such an acid to affect the decomposition profile of acylphosphine oxide photoinitiators was not recognized. Although a few of the inventive examples contain a combination of acylphoxphine oxide and ketosulphone photoinitiators, all of the comparative examples, which are inferior, contain the combination. Therefore, the data in EP 3006515 do not show any advantage to using a combination of acylphosphine oxide and ketosulphone photoinitiators. Furthermore, all of the examples comprise 15.5% (w/w) of phenoxyethylacrylate, a monofunctional monomer. Such a high content of monofunctional monomer would preclude these compositions from being suitable for low migration printing applications.

The reduction of aldehydes produced during UV-cure of compositions containing acylphosphine oxide photoinitiators is of significant value as it further enables the use of such photoinitiators in low migration printing and coating applications, and especially the printing/coating of food packaging where the risks associated with the migration of photoinitiator decomposition products need to be mitigated. By reducing the amount of the aldehyde decomposition products produced by acylphosphine oxide photoinitiators, this not only reduces any potential risk associated with the contamination of packaged foods, but, if the amount of aldehyde can be reduced significantly then this would allow increased concentrations of acylphosphine oxide photoinitiators to be used. This would be distinctly advantageous in instances where the use of such photoinitiators would be desirable, such as in the UV-curing of white coating compositions, and the curing of compositions under the action of UV-LED lamps. Acylphosphine oxide photoinitiators are commonly used in UV-curable inkjet and flexographic ink compositions, and in the case of bis(2,4,6-trimethylbenzoyl)-phenylphospohineoxide, which has a high specific migration limit of 3300 ppb, making it highly suitable for low migration printing applications, reducing the amount of mesitaldehyde produced during UV-cure would enhance the use of this photoinitiator in low migration printing applications. Furthermore, the ability to use acylphosphine oxide photoinitiators in the formulation of UV offset inks to supplant aminoketone photoinitiators, such as 2-benzyl-2-dimethylamino-1-(4-morpholinophenyl)-butanone-1 would be advantageous because aminoketones have suspect toxicological profiles which would exclude them from use in low migration UV-curable printing inks. And, even if other acylphosphine oxide photoinitiators are developed for low migration printing/coating applications, then the issue of the resultant aldehyde decomposition product will remain, and as such, the present invention provides considerable advantage in the use of such photoinitiators.

Advantageously, the amount of aldehyde decomposition products produced by the acylphosphine oxide photoinitiator during the UV-curing process should be reduced by 10% (w/w) or more, preferably 20% (w/w) or more, according to the following equation:

$$X = 100 \times ((AD_0 - AD_a)/AD_0) \geq 10.00$$

wherein
X is the percent reduction of decomposition products;
$AD_0$ is the amount of decomposition products produced during UV-cure of the composition containing an acylphosphine oxide photoinitiator, but without the acid; and $AD_a$ is the amount of decomposition products produced during UV-cure of the composition containing an acylphosphine oxide photoinitiator and an acid.

The present invention describes the most surprising and significant finding that the amount of photodecomposition products from acylphosphine oxide photoinitiators and especially of aldehydes, such as mesitaldehyde, can be significantly reduced by the incorporation of acids, notably sulfonic, phosphoric, and phosphonic acids. The impact of inclusion of an acid is shown in the examples, where the data indicate that the generation of mesitaldehyde (or other aldehydes) from acylphosphine oxide photoinitiators is reduced by levels of up to about 90%.

This advantageous effect, especially for low migration printing and coating applications, has not been previously revealed, nor alluded to, in the prior art.

The present invention covers the use of any acylphosphine oxide photoinitiator, or blends thereof, and includes both mono- and bis-acylphosphine oxides. Suitable acylphosphine oxide photoinitiators include, but are not limited to: bis(2,4,6-trimethylbenzoyl)-phenylphosphineoxide; 2,4,6-trimethylbenzoyl-diphenyl-phosphineoxide; ethyl (2,4,6-trimethylbenzoyl)phenylphosphineoxide; bis(2,6-dimethoxybenzoyl)(2,4,4-trimethylpentyl)phosphineoxide; combinations thereof; and the like. Also included are the acylphosphine oxide photoinitiators disclosed in WO 2006/056541, WO 2015/181332, and U.S. Pat. No. 9,175,098, including the polymerizable, polymeric, and multifunctional types described therein.

Suitable acylphosphine oxide photoinitiators include, but are not limited to: bis(2,4,6-trimethylbenzoyl)-phenylphosphineoxide; bis(2,6-dimethoxybenzoyl)-2,4,4-trimethylpentylphosphinoxide; diphenyl(2,4,6-trimethylbenzoyl)phosphine oxide; ethyl (2,4,6-trimethylbenzoyl) phenylphosphinate; or phosphinic acid, P-(3-benzoyl-2,4,6-trimethylbenzoyl)-P-phenyl-, ethyl ester; combinations thereof; and the like.

Typically, the acylphosphine oxide photoinitiators are present in the compositions of the invention in an amount of about 0.1% to about 10% (w/w) based on the total weight of the composition. Preferably, the acylphosphine oxide photoinitiators are present in an amount of about 0.5% to about 5%, and most preferably from about 0.5% to about 2.5%. For example, the acylphosphine oxide photoinitiators may be present in an amount of about 0.1% to about 9.5%; or about 0.1% to about 9%; or about 0.1% to about 8.5%; or about 0.1% to about 8%; or about 0.1% to about 7.5%; or about 0.1% to about 7%; or about 0.1% to about 6.5%; or about 0.1% to about 6%; or about 0.1% to about 5.5%; or about 0.1% to about 5%; or about 0.1% to about 4.5%; or about 0.1% to about 4%; or about 0.1% to about 3.5%; or about 0.1% to about 3%; or about 0.1% to about 2.5%; or about 0.1% to about 2%; or about 0.1% to about 1.5%; or about 0.1% to about 1%; or about 0.1% to about 0.5%; or about 0.5% to about 10%; or about 0.5% to about 9.5%; or about 0.5% to about 9%; or about 0.5% to about 8.5%; or about 0.5% to about 8%; or about 0.5% to about 7.5%; or about 0.5% to about 7%; or about 0.5% to about 6.5%; or about 0.5% to about 6%; or about 0.5% to about 5.5%; or about 0.5% to about 5%; or about 0.5% to about 4.5%; or about 0.5% to about 4%; or about 0.5% to about 3.5%; or about 0.5% to about 3%; or about 0.5% to about 2.5%; or about 0.5% to about 2%; or about 0.5% to about 1.5%; or about 0.5% to about 1%; or about 1% to about 10%; or about 1% to about 9.5%; or about 1% to about 9%; or about 1% to about 8%; or about 1% to about 7.5%; or about 1% to about 7%; or about 1% to about 6.5%; or about 1% to about 6%; or about 1% to about 5.5%; or about 1% to about 5%; or about 1% to about 4.5%; or about 1% to about 4%; or about 1% to about 3.5%; or about 1% to about 3%; or about 1% to about 2.5%; or about 1% to about 2%; or about 1% to about 1.5%; or about 1.5% to about 10%; or about 1.5% to about 9.5%; or about 1.5% to about 9%; or about 1.5% to about 8.5%; or about 1.5% to about 8%; or about 1.5% to about 7.5%; or about 1.5% to about 7%; or about 1.5% to about 6.5%; or about 1.5% to about 6%; or about 1.5% to about 5.5%; or about 1.5% to about 5%; or about 1.5% to about 4.5%; or about 1.5% to about 4%; or about 1.5% to about 3.5%; or about 1.5% to about 3%; or about 1.5% to about 2.5%; or about 1.5% to about 2%; or about 2% to about 10%; or about 2% to about 9.5%; or about 2% to about 9%; or about 2% to about 8.5%; or about 2% to about 8%; or about 2% to about 7.5%; or about 2% to about 7%; or about 2% to about 6.5%; or about 2% to about 6%; or about 2% to about 5.5%; or about 2% to about 5%; or about 2% to about 4.5%; or about 2% to about 4%; or about 2% to about 3.5%; or about 2% to about 3%; or about 2% to about 2.5%; or about 2.5% to about 10%; or about 2.5% to about 9.5%; or about 2.5% to about 9%; or about 2.5% to about 8.5%; or about 2.5% to about 8%; or about 2.5% to about 7.5%; or about 2.5% to about 7%; or about 2.5% to about 6.5%; or about 2.5% to about 6%; or about 2.5% to about 5.5%; or about 2.5% to about 5%; or about 2.5% to about 4.5%; or about 2.5% to about 4%; or about 2.5% to about 3.5%; or about 2.5% to about 3%; or about 3% to about 10%; or about 3% to about 9.5%; or about 3% to about 9%; or about 3% to about 8.5%; or about 3% to about 8%; or about 3% to about 7.5%; or about 3% to about 7%; or about 3% to about 6.5%; or about 3% to about 6%; or about 3% to about 5.5%; or about 3% to about 5%; or about 3% to about 4.5%; or about 3% to about 4%; or about 3% to about 3.5%; or about 3.5% to about 10%; or about 3.5% to about 9.5%; or about 3.5% to about 9%; or about 3.5% to about 8.5% or about 3.5% to about 8%; or about 3.5% to about 7.5%; or about 3.5% to about 7%; or about 3.5% to about 6.5%; or about 3.5% to about 6%; or about 3.5% to about 5.5%; or about 3.5% to about 5%; or about 3.5% to about 4.5%; or about 3.5% to about 4%; or about 4% to about 10%; or about 4% to about 9.5%; or about 4% to about 9%; or about 4% to about 8.5%; or about 4% to about 8%; or about 4% to about 7.5%; or about 4% to about 7%; or about 4% to about 6.5%; or about 4% to about 6%; or about 4% to about 5.5%; or about 4% to about 5%; or about 4% to about 4.5%; or about 4.5% to about 10%; or about 4.5% to about 9.5%; or about 4.5% to about 9%; or about 4.5% to about 8.5%; or about 4.5% to about 8%; or about 4.5% to about 7.5%; or about 4.5% to about 7%; or about 4.5% to about 6.5%; or about 4.5% to about 6%; or about 4.5% to about 5.5%; or about 4.5% to about 5%; or about 5% to about 10%; or about 5% to about 9.5%; or about 5% to about 9%; or about 5% to about 8.5%; or about 5% to about 8%; or about 5% to about 7.5%; or about 5% to about 7%; or about 5% to about 6%; or about 5% to about 5.5%; or about 5.5% to about 10%; or about 5.5% to about 9.5% or about 5.5% to about 9%; or about 5.5% to about 8.5%; or about 5.5% to about 8%; or about 5.5% to about 7.5%; or about 5.5% to about 7%; or about 5.5% to about 6.5%; or about 5.5% to about 6%; or about 6% to about 10%; or about 6% to about 9.5%; or about 6% to about 9%; or about 6% to about 8.5% or about 6% to about 8%; or about 6% to about 7.5%; or about 6% to about 7%; or about 6% to about 6.5%; or about 6.5% to about 10%; or about 6.5% to about 9.5%; or about 6.5% to about 9%; or about 6.5% to about 8.5%; or about 6.5% to about 8%; or about 6.5% to about 7.5%; or about 6.5% to about 7%; or about 7% to about 10%; or about 7% to about 9.5%; or about 7% to about 9%; or about 7% to about 8.5%; or about 7% to about 8%; or about 7% to about 7.5%; or about 7.5% to about 10%; or about 7.5% to about 9.5%; or about 7.5% to about 9%; or about 7.5% to about 8.5%; or about 7.5% to about 8%; or about 8% to about 10%; or about 8% to about 9.5%; or about 8% to about 9%; or about 8% to about 8.5%; or about 8.5% to about 10%; or about 8.5% to about 9.5%; or about 8.5% to about 9%; or about 9% to about 10%; or about 9% to about 9.5%; or about 9.5% to about 10%.

The acid may be inorganic or organic, and may optionally be produced by the action of UV light on a photoacid generator. The photoacid generator may be a cationic photoinitiator or a ketosulphone free radical photoinitiator. In the case of ketosulphone photoinitiators, it is believed that a disproportionation process of the sulpho radical produced during the photoinitiation process results in the formation of a sulphonic acid. Where PAGs are used to generate the required acid, the inventors have demonstrated that the effect is only observed when the PAG is exposed to UV-light which the PAG, or an associated UV sensitizer, can absorb. Thus, in the case of the ketosulphone photoinitiator 1-{4-[(4-benzoylphenyl)sulfanyl]phenyl}-2-methyl-2-[(4-methylphenyl)sulfonyl]propan-1-one, when this is exposed to the UV-light from a medium pressure H-bulb then the effect is observed. However, when a UV-LED lamp emitting at 395 nm was used no aldehyde reducing effect was observed, no doubt due to the negligible absorption of this photoinitiator at 395 nm, and consequently little production of the required photoacid. To overcome this, UV sensitizers which are able to absorb the UV light emitted by a source, including UV-LED, and transfer this energy to the PAG may be used. Examples of suitable sensitizers include thioxanthones, anthracenes, napththalenes, and perylenes. The sensitizers described in U.S. Pat. Nos. 6,313,188 and 8,785,515 are suitable, and are herein included in the present invention.

There is no restriction on the nature of the acid or photoacid generator, or blends thereof, used in the present invention, other than they should induce a 10%, or more, lowering in the amount of aldehyde photodecomposition products produced by the acylphosphine oxide photoinitiators during UV cure. Preferably, the acid or photoacid generator induce a reduction of 20% or more, and most preferably, 50% or more, of the aldehyde photodecomposition products produced by the acylphosphine oxide photoinitiators during UV cure. Although weak acids, such as carboxylic acids, can be used, the inventors have found that stronger acids, such as sulphonic, phosphoric, and phosphonic acids, are especially effective in their capacity to cause this reduction in aldehyde production from acylphosphine oxide photoinitiators. The present invention encompasses both inorganic and organic acid, although in the case where acids, rather than photoacids, are used, it is preferred that an organic acid be used. Again, where organic acids are used, there is no restriction on the nature of the acid, other than that the organic acid be compatible with the ink or coating composition, and is able to induce the 10% or more reduction in the amount of photodecomposition products produced by the acylphosphine oxide photoinitiators during the UV-curing process.

Where a photoacid generator (PAG) is used to generate the acid in-situ during the UV-curing process, preferred types include cationic and ketosulphone photoinitiators. Where ketosulphone photoinitiators are used, a preferred type is 1-{4-[(4-benzoylphenyl)sulfanyl]phenyl}-2-methyl-2-[(4-methylphenyl)sulfonyl]propan-1-one. However, any ketosulphone photoinitiator can be used, and those disclosed in WO 2000/031030 are incorporated herein into the present invention.

Where a cationic photoinitiator is used to generate the acid in situ during the UV-curing process, those producing sulphonic, phosphoric, phosphonic, antimonic, and nitric derivatives may be used. Both sulfonium salt (including triarylsulfonium hexafluorphosphate) and iodonium salt cationic photoinitators are covered by the present invention. Suitable cationic photoinitiators include, but are not limited to: triphenylsulfonium hexafluorophosphate; 4,4'-diemthyldiphenyl iodonium hexafluorophosphate; 10-biphenyl-4-yl-2-isopropyl-9-oxo-9H-thioxanthen-10-ium hexafluorosphosphate; bis(dodecylphenyl)-iodoniumhexafluoroantimonate; bis-(4-methyl-phenyl)-iodoniumhexafluorophosphate; bis-(($C_{10}$-$C_{14}$)-alkylphenyl)iodoniumhexafluoro-antimonite; bis-(4,4-dodecylphenyl)-iodoniumhexaflurophosphate; bis(4-tert-butylphenyl) iodonium perfluoro-1-butanesulfonate; bis(4-tert-butylphenyl)iodonium p-toluenesulfonate; bis(4-tert-butylphenyl)iodonium triflate; boc-methoxyphenyldiphenyldulfonium triflate; (4-tert-butylphenyl)diphenylsulfonium triflate; diphenyliodonium hexafluorophosphate; diphenyliodonium perfluoro-1-butanesulfonate; diphenyliodonium p-toluenesulfonate; diphenyliodonium nitrate; (4-iodophenyl)diphenylsulfonium triflate; (4-methylphgenyl)diphenyldulfonium triflate; triarylsulfonium hexafluoroantimonate salts; triphenylsulfonium triflate; combinations; and the like.

When a PAG is used, there is no lower limit on the amount, other than it is sufficient to produce a reduction of 10% or more in the production of photodecomposition products of acylphosphine oxides during the UV-curing process. Typically, PAGs are present in the compositions of the invention in an amount of about 0.1% to about 10.0% (w/w), based on the total weight of the composition. Preferably, PAGs are present in an amount of about 0.25% and about 5.0% (w/w), and most preferably between about 0.5% and about 2.5% (w/w), based on the total weight of the composition. For example, PAGs may be present in an amount of about 0.1% to about 9.5%; or about 0.1% to about 9%; or about 0.1% to about 8.5%; or about 0.1% to about 8%; or about 0.1% to about 7.5%; or about 0.1% to about 7%; or about 0.1% to about 6.5%; or about 0.1% to about 6%; or about 0.1% to about 5.5%; or about 0.1% to about 5%; or about 0.1% to about 4.5%; or about 0.1% to about 4%; or about 0.1% to about 3.5%; or about 0.1% to about 3%; or about 0.1% to about 2.5%; or about 0.1% to about 2%; or about 0.1% to about 1.5%; or about 0.1% to about 1%; or about 0.1% to about 0.5%; or about 0.5% to about 10%; or about 0.5% to about 9.5%; or about 0.5% to about 9%; or about 0.5% to about 8.5%; or about 0.5% to about 8%; or about 0.5% to about 7.5%; or about 0.5% to about 7%; or about 0.5% to about 6.5%; or about 0.5% to about 6%; or about 0.5% to about 5.5%; or about 0.5% to about 5%; or about 0.5% to about 4.5%; or about 0.5% to about 4%; or about 0.5% to about 3.5%; or about 0.5% to about 3%; or about 0.5% to about 2.5%; or about 0.5% to about 2%; or about 0.5% to about 1.5%; or about 0.5% to about 1%; or about 1% to about 10%; or about 1% to about 9.5%; or about 1% to about 9%; or about 1% to about 8%; or about 1% to about 7.5%; or about 1% to about 7%; or about 1% to about 6.5%; or about 1% to about 6%; or about 1% to about 5.5%; or about 1% to about 5%; or about 1% to about 4.5%; or about 1% to about 4%; or about 1% to about 3.5%; or about 1% to about 3%; or about 1% to about 2.5%; or about 1% to about 2%; or about 1% to about 1.5%; or about 1.5% to about 10%; or about 1.5% to about 9.5%; or about 1.5% to about 9%; or about 1.5% to about 8.5%; or about 1.5% to about 8%; or about 1.5% to about 7.5%; or about 1.5% to about 7%; or about 1.5% to about 6.5%; or about 1.5% to about 6%; or about 1.5% to about 5.5%; or about 1.5% to about 5%; or about 1.5% to about 4.5%; or about 1.5% to about 4%; or about 1.5% to about 3.5%; or about 1.5% to about 3%; or about 1.5% to about 2.5%; or about 1.5% to about 2%; or about 2% to about 10%; or about 2% to about 9.5%; or about 2% to about 9%; or about 2% to about 8.5%; or about 2% to about 8%; or about 2% to about 7.5%; or about 2% to about 7%; or about 2% to about 6.5%; or about 2% to about 6%; or about 2% to about 5.5%; or about 2% to about 5%; or about 2% to about 4.5%; or about 2% to about 4%; or about 2% to about 3.5%; or about 2% to about 3%; or about 2% to about 2.5%; or about 2.5% to about 10%; or about 2.5% to about 9.5%; or about 2.5% to about 9%; or about 2.5% to about 8.5%; or about 2.5% to about 8%; or about 2.5% to about 7.5%; or about 2.5% to about 7%; or about 2.5% to about 6.5%; or about 2.5% to about 6%; or about 2.5% to about 5.5%; or about 2.5% to about 5%; or about 2.5% to about 4.5%; or about 2.5% to about 4%; or about 2.5% to about 3.5%; or about 2.5% to about 3%; or about 3% to about 10%; or about 3% to about 9.5%; or about 3% to about 9%; or about 3% to about 8.5%; or about 3% to about 8%; or about 3% to about 7.5%; or about 3% to about 7%; or about 3% to about 6.5%; or about 3% to about 6%; or about 3% to about 5.5%; or about 3% to about 5%; or about 3% to about 4.5%; or about 3% to about 4%; or about 3% to about 3.5%; or about 3.5% to about 10%; or about 3.5% to about 9.5%; or about 3.5% to about 9%; or about 3.5% to about 8.5% or about 3.5% to about 8%; or about 3.5% to about 7.5%; or about 3.5% to about 7%; or about 3.5% to about 6.5%; or about 3.5% to about 6%; or about 3.5% to about 5.5%; or about 3.5% to about 5%; or about 3.5% to about 4.5%; or about 3.5% to about 4%; or about 4% to about 10%; or about 4% to about 9.5%; or about 4% to about 9%; or about 4% to about 8.5%; or about 4% to about 8%; or about 4% to about 7.5%; or about 4% to about 7%; or about 4% to about 6.5%; or about 4% to about 6%; or about 4% to about 5.5%; or about 4% to about 5%; or about 4% to about 4.5%; or about 4.5% to about 10%; or about 4.5% to about 9.5%; or about 4.5% to about 9%; or about 4.5% to about 8.5%; or about 4.5% to about 8%; or about 4.5% to about 7.5%; or about 4.5% to about 7%; or about 4.5% to about 6.5%; or about 4.5% to about 6%; or about 4.5% to about 5.5%; or about 4.5% to about 5%; or about 5% to about 10%; or about 5% to about 9.5%; or about 5% to about 9%; or about 5% to about 8.5%; or about 5% to about 8%; or about 5% to about 7.5%; or about 5% to about 7%; or about 5% to about 6%; or about 5% to about 5.5%; or about 5.5% to about 10%; or about 5.5% to about 9.5% or about 5.5% to about 9%; or about 5.5% to about 8.5%; or about 5.5% to about 8%; or about 5.5% to about 7.5%; or about 5.5% to about 7%; or about 5.5% to about 6.5%; or about 5.5% to about 6%; or about 6% to about 10%; or about 6% to about 9.5%; or about 6% to about 9%; or about 6% to about 8.5% or about 6% to about 8%; or about 6% to about 7.5%; or about 6% to about 7%; or about 6% to about 6.5%; or about 6.5% to about 10%; or about 6.5% to about 9.5%; or about 6.5% to about 9%; or about 6.5% to about 8.5%; or about 6.5% to about 8%; or about 6.5% to about 7.5%; or about 6.5% to about 7%; or about 7% to about 10%; or about 7% to about 9.5%; or about 7% to about 9%; or about 7% to about 8.5%; or about 7% to about 8%; or about 7% to about 7.5%; or about 7.5% to about 10%; or about 7.5% to about 9.5%; or about 7.5% to about 9%; or about 7.5% to about 8.5%; or about 7.5% to about 8%; or about 8% to about 10%; or about 8% to about 9.5%; or about 8% to about 9%; or about 8% to about 8.5%; or about 8.5% to about 10%; or about 8.5% to about 9.5%; or about 8.5% to about 9%; or about 9% to about 10%; or about 9% to about 9.5%; or about 9.5% to about 10%.

When acids are included in the compositions of the present invention, any acid may be used as long as it produces a 10% or greater reduction in the amount of decomposition product produced by the acylphosphine oxide photoinitiators during UV-curing. The acid may be monofunctional or polyfunctional with respect to the number of acid groups per molecule. To improve the compatibility of the acid with the rest of the components in the compositions of the present invention, it is preferred that the acid be organically modified. Organic carboxylic acids can be used, but the inventors have found that organically modified sulphonic and phosphoric acids produce a more pronounced effect with respect to the lowering of mesitaldehyde production when compositions of the invention comprise bis(2,4,6-trimethylbenzoyl)-phenylphosphineoxide as the acylphosphine oxide photoinitiator.

Suitable sulphonic acids include those according to the following formula:

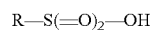

where R may be H, an alkyl or aryl group. When R is an alkyl or aryl group, these may be optionally substituted. Suitable sulphonic acids include, but are not limited to: benzenesulphonic acid; p-toluenesulphonic acid; sulfosalicylic acid; triflic acid; camphorsulphonic acid; taurine; sulfoacetic acid; ethanesulfonic acid; 1-propanesulfonic acid; 3-hydroxypropane-1-sulfonic acid; 1,3-propanedisulfonic acid; 3-amino-1-propanesulfonic acid; 4-bromobenzenesulfonic acid; hydroquinonesulfonic acid; sulfanilic acid; 4-ethylbenzenesulfonic acid; dodecylbenzenesulfonic acid; combinations thereof; and the like. Polymerizable and polymeric sulphonic acid derivatives may also be used, and suitable examples of these include, but are not limited to: nafion (perfluoro(2-(2-sulfonylethoxy)propyl vinyl ether)-tetrafluoroethylene copolymer); 2-acrylamido-2-methyl-1-propanesulfonic acid (AMPS); 2-propene-1-sulfonic acid; 2-sulfoethyl methacrylate; 3-sulfopropyl methacrylate; combinations thereof; and the like. Also encompassed by the present invention is the use of any sulphonic acid, which is part, or fully, neutralized with a base.

Suitable phosphoric acids include those according to the following formula:

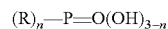

where R may be H, an alkyl or aryl group; and n is an integer from 1 to 2. When R is an alkyl or aryl group, this may be optionally substituted. Suitable phosphoric acids include, but are not limited to: phosphoric acid; phosphonic acid; phosphoric acid-2-hydroxyethyl methacrylate; binol phosphoric acid and substituted binol-phosphoric acids; bis(2-methacryloxyethyl)phosphate; vinylphosphoric acid; ethyl acid phosphate; butyl acid phosphate; combinations thereof; and the like.

Any carboxylic acid may be used in the compositions of the present invention, and these acids may be mono- or poly-functional with respect to the acid groups, and polymeric and polymerizable types are hereby included. Suitable carboxylic acids include, but are not limited to: acetic acid; propionic acid; butyric acid; caproic acid; oxalic acid; malic acid; lactic acid; citric acid; acrylic acid; maleic acid; fumaric acid; 3-butene-1,2,3-tricarboxylic acid; (3-carboxyethyl acrylate; methacrylic acid; 4-vinylbenzoic acid; angelic acid; cytronellic acid; ricin acid; oleic acid; palmitooleic acid; erucic acid; sorbic acid; linolenic acid; itaconic acid; combinations thereof; and the like. Homo- and co-polymers of acrylic acid or methacrylic acid may be used, as may any homo- or co-polymer of any ethylenically unsaturated carboxylic acid. Styrene-maleic anhydride copolymers may be used as well as the half-esters thereof, including the half-esters produced by reaction of the styrene-maleic acid copolymer with hydroxyl-functional (meth)acrylate monomers, such as the Sarbox range of oligomers available from Arkema. Other polymerizable carboxylic acids that may be used in the present invention include carboxylic acid functional epoxy acrylate resins. These resins can be produced by the reaction of a polyepoxide resin with an ethylenically unsaturated carboxylic acid, such as acrylic acid, to produce an intermediate hydroxyl-functional ethylenically unsaturated resin. This intermediate resin is then further reacted with polyfunctional carboxylic acids or anhydrides, such as terephthalic anhydride, to produce the final carboxylic acid-functional photocurable resin.

There is no lower or upper limit on the amount of acid that is used in the compositions of the present invention, and acids may be combined with PAGs to produce the desired effect. Typically, the concentration of any acid or blend of acids is between about 0.1% and 20% (w/w), based on the total weight of the composition. Preferably, the concentration of any acid or blend of acids is from about 0.5% to about 10% (w/w), and most preferably about 0.5% to about 5% (w/w), based on the total weight of the composition. The acid or blend of acids may be present in a concentration of about 0.1% to about 15%; or about 0.1% to about 10%. For example, the acid or blend of acids may be present in an amount of about 0.1% to about 9.5%; or about 0.1% to about 9%; or about 0.1% to about 8.5%; or about 0.1% to about 8%; or about 0.1% to about 7.5%; or about 0.1% to about 7%; or about 0.1% to about 6.5%; or about 0.1% to about 6%; or about 0.1% to about 5.5%; or about 0.1% to about 5%; or about 0.1% to about 4.5%; or about 0.1% to about 4%; or about 0.1% to about 3.5%; or about 0.1% to about 3%; or about 0.1% to about 2.5%; or about 0.1% to about 2%; or about 0.1% to about 1.5%; or about 0.1% to about 1%; or about 0.1% to about 0.5%; or about 0.5% to about 10%; or about 0.5% to about 9.5%; or about 0.5% to about 9%; or about 0.5% to about 8.5%; or about 0.5% to about 8%; or about 0.5% to about 7.5%; or about 0.5% to about 7%; or about 0.5% to about 6.5%; or about 0.5% to about 6%; or about 0.5% to about 5.5%; or about 0.5% to about 5%; or about 0.5% to about 4.5%; or about 0.5% to about 4%; or about 0.5% to about 3.5%; or about 0.5% to about 3%; or about 0.5% to about 2.5%; or about 0.5% to about 2%; or about 0.5% to about 1.5%; or about 0.5% to about 1%; or about 1% to about 10%; or about 1% to about 9.5%; or about 1% to about 9%; or about 1% to about 8%; or about 1% to about 7.5%; or about 1% to about 7%; or about 1% to about 6.5%; or about 1% to about 6%; or about 1% to about 5.5%; or about 1% to about 5%; or about 1% to about 4.5%; or about 1% to about 4%; or about 1% to about 3.5%; or about 1% to about 3%; or about 1% to about 2.5%; or about 1% to about 2%; or about 1% to about 1.5%; or about 1.5% to about 10%; or about 1.5% to about 9.5%; or about 1.5% to about 9%; or about 1.5% to about 8.5%; or about 1.5% to about 8%; or about 1.5% to about 7.5%; or about 1.5% to about 7%; or about 1.5% to about 6.5%; or about 1.5% to about 6%; or about 1.5% to about 5.5%; or about 1.5% to about 5%; or about 1.5% to about 4.5%; or about 1.5% to about 4%; or about 1.5% to about 3.5%; or about 1.5% to about 3%; or about 1.5% to about 2.5%; or about 1.5% to about 2%; or about 2% to about 10%; or about 2% to about 9.5%; or about 2% to about 9%; or about 2% to about 8.5%; or about 2% to about 8%; or about 2% to about 7.5%; or about 2% to about 7%; or about 2% to about 6.5%; or about 2% to about 6%; or about 2% to about 5.5%; or about 2% to about 5%; or about 2% to about 4.5%; or about 2% to about 4%; or about 2% to about 3.5%; or about 2% to about 3%; or about 2% to about 2.5%; or about 2.5% to about 10%; or about 2.5% to about 9.5%; or about 2.5% to about 9%; or about 2.5% to about 8.5%; or about 2.5% to about 8%; or about 2.5% to about 7.5%; or about 2.5% to about 7%; or about 2.5% to about 6.5%; or about 2.5% to about 6%; or about 2.5% to about 5.5%; or about 2.5% to about 5%; or about 2.5% to about 4.5%; or about 2.5% to about 4%; or about 2.5% to about 3.5%; or about 2.5% to about 3%; or about 3% to about 10%; or about 3% to about 9.5%; or about 3% to about 9%; or about 3% to about 8.5%; or about 3% to about 8%; or about 3% to about 7.5%; or about 3% to about 7%; or about 3% to about 6.5%; or about 3% to about 6%; or about 3% to about 5.5%; or about 3% to about 5%; or about 3% to about 4.5%; or about 3% to about 4%; or about 3% to about 3.5%; or about 3.5% to about 10%; or about 3.5% to about 9.5%; or about 3.5% to about 9%; or about 3.5% to about 8.5% or about 3.5% to about 8%; or about 3.5% to about 7.5%; or about 3.5% to about 7%; or about 3.5% to about 6.5%; or about 3.5% to about 6%; or about 3.5% to about 5.5%; or about 3.5% to about 5%; or about 3.5% to about 4.5%; or about 3.5% to about 4%; or about 4% to about 10%; or about 4% to about 9.5%; or about 4% to about 9%; or about 4% to about 8.5%; or about 4% to about 8%; or about 4% to about 7.5%; or about 4% to about 7%; or about 4% to about 6.5%; or about 4% to about 6%; or about 4% to about 5.5%; or about 4% to about 5%; or about 4% to about 4.5%; or about 4.5% to about 10%; or about 4.5% to about 9.5%; or about 4.5% to about 9%; or about 4.5% to about 8.5%; or about 4.5% to about 8%; or about 4.5% to about 7.5%; or about 4.5% to about 7%; or about 4.5% to about 6.5%; or about 4.5% to about 6%; or about 4.5% to about 5.5%; or about 4.5% to about 5%; or about 5% to about 10%; or about 5% to about 9.5%; or about 5% to about 9%; or about 5% to about 8.5%; or about 5% to about 8%; or about 5% to about 7.5%; or about 5% to about 7%; or about 5% to about 6%; or about 5% to about 5.5%; or about 5.5% to about 10%; or about 5.5% to about 9.5% or about 5.5% to about 9%; or about 5.5% to about 8.5%; or about 5.5% to about 8%; or about 5.5% to about 7.5%; or about 5.5% to about 7%; or about 5.5% to about 6.5%; or about 5.5% to about 6%; or about 6% to about 10%; or about 6% to about 9.5%; or about 6% to about 9%; or about 6% to about 8.5% or about 6% to about 8%; or about 6% to about 7.5%; or about 6% to about 7%; or about 6% to about 6.5%; or about 6.5% to about 10%; or about 6.5% to about 9.5%; or about 6.5% to about 9%; or about 6.5% to about 8.5%; or about 6.5% to about 8%; or about 6.5% to about 7.5%; or about 6.5% to about 7%; or about 7% to about 10%; or about 7% to about 9.5%; or about 7% to about 9%; or about 7% to about 8.5%; or about 7% to about 8%; or about 7% to about 7.5%; or about 7.5% to about 10%; or about 7.5% to about 9.5%; or about 7.5% to about 9%; or about 7.5% to about 8.5%; or about 7.5% to about 8%; or about 8% to about 10%; or about 8% to about 9.5%; or about 8% to about 9%; or about 8% to about 8.5%; or about 8.5% to about 10%; or about 8.5% to about 9.5%; or about 8.5% to about 9%; or about 9% to about 10%; or about 9% to about 9.5%; or about 9.5% to about 10%.

As well as acylphosphine oxide (APO) photoinitiators, there is no restriction on the type, blend or concentration of other free radical photoinitiators used. Suitable photoinitiators include, but are not limited to, α-hydroxyketones, α-aminoketones, thioxanthones, benzophenones, phenyl glyoxylates, oxime esters, acetophenones, benzil compounds and derivatives thereof, fluorenones, anthraquinones, combinations thereof, and the like.

Suitable α-hydroxyketones include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-hydroxy-1-[1-[4-(2-hydroxy-2-methylpropanoyl)phenyl]-1,3,3-trimethylindan-5-yl]-2-methylpropan-1-one; 2-hydroxy-1-[4-[4-(2-hydroxy-2-methylpropanoyl)phenoxy]phenyl]-2-methylpropan-1-one; combinations thereof; and the like.

Suitable α-aminoketones include, but are not limited to: 2-methyl-1-[4-(methylthio)phenyl]-2-morpholinopropan-1-one; 2-benzyl-2-dimethylamino-1-(4-morpholinophenyl)-butan-1-one; 2-dimethylamino-2-(4-methyl-benzyl)-1-(4-morpholin-4-yl-phenyl)-butan-1-one; combinations thereof; and the like.

Suitable thioxanthones include, but are not limited to: 2-4-diethylthioxanthone; isopropylthioxanthone; 2-chlorothioxanthone; 1-chloro-4-propoxythioxanthone; combinations thereof; and the like.

Suitable benzophenones include, but are not limited to: benzophenone, 4-phenylbenzophenone; and 4-methylbenzophenone; methyl-2-benzoylbenzoate; 4-benzoyl-4-methyldiphenyl sulphide; 4-hydroxybenzophenone; 2,4,6-trimethyl benzophenone; 4,4-bis(diethylamino)benzophenone; benzophenone-2-carboxy(tetraethoxy)acrylate; 4-hydroxybenzophenone laurate; 1-[-4-[benzoylphenylsulpho]phenyl]-2-methyl-2-(4-methylphenylsulphonyl)propan-1-one; combinations thereof; and the like.

Suitable phenylglyoxylates include, but are not limited to: phenyl glyoxylic acid methyl ester; oxy-phenyl-acetic acid 2-[hydroxy-ethoxy]-ethyl ester; oxy-phenyl-acetic acid 2-[2-oxo-2-phenyl-acetoxy-ethoxy]-ethyl ester; combinations thereof; and the like.

Suitable oxime esters include, but are not limited to: 1-phenyl-1,2-propanedione-2-(O-ethoxycarbonyl)oxime; [1-(4-phenylsulfanylbenzoyl)heptylideneamino]benzoate; [1-[9-ethyl-6-(2-methylbenzoyl)carbazol-3-yl]-ethylideneamino]acetate; combinations thereof; and the like.

Examples of other suitable photoinitiators include diethoxy acetophenone; benzil; benzil dimethyl ketal; titanocen radical initiators such as titanium-bis(u 5-2,4-cyclopentadien-1-yl)-bis-[2,6-difluoro-3-(1H-pyrrol-1-yl)phenyl]; 9-fluorenone; camphorquinone; 2-ethyl anthraquinone; combinations thereof; and the like.

An amine synergist may also optionally be included in the formulation. Suitable examples include, but are not limited to: aromatic amines, such as 2-(dimethylamino)ethylbenzoate; N-phenyl glycine; benzoic acid, 4-(dimethylamino)-, 1,1'-[(methylimino)di-2,1-ethanediyl] ester; and simple alkyl esters of 4-(N,N-dimethylamino)benzoic acid and other positional isomers of N,N-dimethylamino)benzoic acid esters, with ethyl, amyl, 2-butoxyethyl and 2-ethylhexyl esters being particularly preferred; aliphatic amines, such as such as N-methyldiethanolamine, triethanolamine and tri-isopropanolamine; aminoacrylates and amine modified polyether acrylates, such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER P077F, all available from BASF; AGISYN 701, AGISYN 702, AGISYN 703, NeoRad P-81 and NeoRad P-85 all available from DSM-AGI.

Polymeric photoinitiators and sensitizers are also suitable, including, for example, polymeric aminobenzoates (GENOPOL AB-1 or AB-2 from RAHN; Omnipol ASA from IGM or Speedcure 7040 from Lambson), polymeric benzophenone derivatives (GENOPOL BP-1 or BP-2 from RAHN; Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitizer Omnipol SZ from IGM.

UV sensitizers may also optionally be included in the compositions of the present invention. Typical sensitizers include thioxanthones, anthracenes, napthalenes, perylenes, and any of the sensitizers described in U.S. Pat. Nos. 6,313,188 and 8,785,515; combinations thereof; and the like. Preferred UV sensitizers are thioxanthones suitable for low migration applications, such as multifunctional, polymeric, or polymerizable thioxanthones.

When present, the UV sensitizer is typically present in an amount of about 0.1% to about 10% (w/w), based on the total weight of the composition. Preferably, the amount of UV sensitizer is about 0.5% to about 5% (w/w). For example, the UV sensitizer may be present in an amount of about 0.1% to about 9.5%; or about 0.1% to about 9%; or about 0.1% to about 8.5%; or about 0.1% to about 8%; or about 0.1% to about 7.5%; or about 0.1% to about 7%; or about 0.1% to about 6.5%; or about 0.1% to about 6%; or about 0.1% to about 5.5%; or about 0.1% to about 5%; or about 0.1% to about 4.5%; or about 0.1% to about 4%; or about 0.1% to about 3.5%; or about 0.1% to about 3%; or about 0.1% to about 2.5%; or about 0.1% to about 2%; or about 0.1% to about 1.5%; or about 0.1% to about 1%; or about 0.1% to about 0.5%; or about 0.5% to about 10%; or about 0.5% to about 9.5%; or about 0.5% to about 9%; or about 0.5% to about 8.5%; or about 0.5% to about 8%; or about 0.5% to about 7.5%; or about 0.5% to about 7%; or about 0.5% to about 6.5%; or about 0.5% to about 6%; or about 0.5% to about 5.5%; or about 0.5% to about 5%; or about 0.5% to about 4.5%; or about 0.5% to about 4%; or about 0.5% to about 3.5%; or about 0.5% to about 3%; or about 0.5% to about 2.5%; or about 0.5% to about 2%; or about 0.5% to about 1.5%; or about 0.5% to about 1%; or about 1% to about 10%; or about 1% to about 9.5%; or 1% to about 9%; or about 1% to about 8%; or about 1% to about 7.5%; or about 1% to about 7%; or about 1% to about 6.5%; or about 1% to about 6%; or about 1% to about 5.5%;

or about 1% to about 5%; or about 1% to about 4.5%; or about 1% to about 4%; or about 1% to about 3.5%; or about 1% to about 3%; or about 1% to about 2.5%; or about 1% to about 2%; or about 1% to about 1.5%; or about 1.5% to about 10%; or about 1.5% to about 9.5%; or about 1.5% to about 9%; or about 1.5% to about 8.5%; or about 1.5% to about 8%; or about 1.5% to about 7.5%; or about 1.5% to about 7%; or about 1.5% to about 6.5%; or about 1.5% to about 6%; or about 1.5% to about 5.5%; or about 1.5% to about 5%; or about 1.5% to about 4.5%; or about 1.5% to about 4%; or about 1.5% to about 3.5%; or about 1.5% to about 3%; or about 1.5% to about 2.5%; or about 1.5% to about 2%; or about 2% to about 10%; or about 2% to about 9.5%; or about 2% to about 9%; or about 2% to about 8.5%; or about 2% to about 8%; or about 2% to about 7.5%; or about 2% to about 7%; or about 2% to about 6.5%; or about 2% to about 6%; or about 2% to about 5.5%; or about 2% to about 5%; or about 2% to about 4.5%; or about 2% to about 4%; or about 2% to about 3.5%; or about 2% to about 3%; or about 2% to about 2.5%; or about 2.5% to about 10%; or about 2.5% to about 9.5%; or about 2.5% to about 9%; or about 2.5% to about 8.5%; or about 2.5% to about 8%; or about 2.5% to about 7.5%; or about 2.5% to about 7%; or about 2.5% to about 6.5%; or about 2.5% to about 6%; or about 2.5% to about 5.5%; or about 2.5% to about 5%; or about 2.5% to about 4.5%; or about 2.5% to about 4%; or about 2.5% to about 3.5%; or about 2.5% to about 3%; or about 3% to about 10%; or about 3% to about 9.5%; or about 3% to about 9%; or about 3% to about 8.5%; or about 3% to about 8%; or about 3% to about 7.5%; or about 3% to about 7%; or about 3% to about 6.5%; or about 3% to about 6%; or about 3% to about 5.5%; or about 3% to about 5%; or about 3% to about 4.5%; or about 3% to about 4%; or about 3% to about 3.5%; or about 3.5% to about 10%; or about 3.5% to about 9.5%; or about 3.5% to about 9%; or about 3.5% to about 8.5% or about 3.5% to about 8%; or about 3.5% to about 7.5%; or about 3.5% to about 7%; or about 3.5% to about 6.5%; or about 3.5% to about 6%; or about 3.5% to about 5.5%; or about 3.5% to about 5%; or about 3.5% to about 4.5%; or about 3.5% to about 4%; or about 4% to about 10%; or about 4% to about 9.5%; or about 4% to about 9%; or about 4% to about 8.5%; or about 4% to about 8%; or about 4% to about 7.5%; or about 4% to about 7%; or about 4% to about 6.5%; or about 4% to about 6%; or about 4% to about 5.5%; or about 4% to about 5%; or about 4% to about 4.5%; or about 4.5% to about 10%; or about 4.5% to about 9.5%; or about 4.5% to about 9%; or about 4.5% to about 8.5%; or about 4.5% to about 8%; or about 4.5% to about 7.5%; or about 4.5% to about 7%; or about 4.5% to about 6.5%; or about 4.5% to about 6%; or about 4.5% to about 5.5%; or about 4.5% to about 5%; or about 5% to about 10%; or about 5% to about 9.5%; or about 5% to about 9%; or about 5% to about 8.5%; or about 5% to about 8%; or about 5% to about 7.5%; or about 5% to about 7%; or about 5% to about 6%; or about 5% to about 5.5%; or about 5.5% to about 10%; or about 5.5% to about 9.5% or about 5.5% to about 9%; or about 5.5% to about 8.5%; or about 5.5% to about 8%; or about 5.5% to about 7.5%; or about 5.5% to about 7%; or about 5.5% to about 6.5%; or about 5.5% to about 6%; or about 6% to about 10%; or about 6% to about 9.5%; or about 6% to about 9%; or about 6% to about 8.5% or about 6% to about 8%; or about 6% to about 7.5%; or about 6% to about 7%; or about 6% to about 6.5%; or about 6.5% to about 10%; or about 6.5% to about 9.5%; or about 6.5% to about 9%; or about 6.5% to about 8.5%; or about 6.5% to about 8%; or about 6.5% to about 7.5%; or about 6.5% to about 7%; or about 7% to about 10%; or about 7% to about 9.5%; or about 7% to about 9%; or about 7% to about 8.5%; or about 7% to about 8%; or about 7% to about 7.5%; or about 7.5% to about 10%; or about 7.5% to about 9.5%; or about 7.5% to about 9%; or about 7.5% to about 8.5%; or about 7.5% to about 8%; or about 8% to about 10%; or about 8% to about 9.5%; or about 8% to about 9%; or about 8% to about 8.5%; or about 8.5% to about 10%; or about 8.5% to about 9.5%; or about 8.5% to about 9%; or about 9% to about 10%; or about 9% to about 9.5%; or about 9.5% to about 10%.

Since the compositions of the present invention are intended for use in low migration applications, such as low migration inks and coatings, it is preferred that photoinitiators having low migration potential are used. Therefore, polymeric, polymerizable, and multifunctional types are preferred.

Compositions according to the present invention may comprise any amount of any blend of free radically polymerizable monomers and oligomers.

Examples of suitable monofunctional ethylenically unsaturated monomers include, but are not limited, to the following: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t-butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethyleneglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acylate; polyethylene glycol o-phenyl phenyl ether acrylate; ethoxylatedp-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl-1,2-(acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxybutyl acrylate; combinations thereof, and the like. As used herein, the term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Since compositions prepared according to the present invention are intended for the low migration printing and coating of low migration applications, including the printing and coating of food packaging, then the amount of any monofunctional monomer used should be limited so as to reduce the risk associated with the migration of uncured monomer present in UV-cured ink or coating. Therefore, another aspect of the present invention is that the amount of any individual monofunctional monomer should be 15% (w/w), or less, preferably 10% (w/w) or less, more preferably 5% (w/w) or less, yet more preferably 2.5% (w/w) or less, based on the total weight of the composition, and most preferably the compositions would contain no monofunctional monomers.

Where monomers are used in the preparation of inventive compositions it is preferable that they be multifunctional with respect to their polymerizable groups. Multifunctional monomers, having two or more ethylenically unsaturated groups, such as acrylate, have a greater probability of reacting into the UV-cured ink or coating compared with a monofunctional monomer, thereby reducing the risk of potential contamination arising from uncured monomer. Examples of suitable multifunctional ethylenically unsaturated monomers include but are not limited to the following: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3-methyl-1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10-decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxyethyl)isocyanurate triacrylate; ε-caprolactone modified tris(2-hydroxyethyl)isocyanurate triacrylate; melamine acrylate oligomer; pentaerythritol tetraacrylate; ethoxylated pentaerythritol tetraacrylate; di-trimethylolpropane tetra acrylate; dipentaerythritol pentaacrylate; dipentaerythritol hexaacrylate; ethoxylated dipentaerythritol hexaacrylate; combinations thereof, and the like. The term ethoxylated refers to chain extended compounds through the use of ethylene oxide, propoxylated refers to chain extended compounds through the use of propylene oxide, and alkoxylated refers to chain extended compounds using either or both ethylene oxide and propylene oxide. Equivalent methacrylate compounds are also capable of being used, although those skilled in the art will appreciate that methacrylate compounds have lower reactivity than their equivalent acrylate counterparts.

Examples of monomers comprising free-radically polymerizable groups other than acrylate include N-vinyl amides. Suitable additional free-radically polymerizable monomers include, but are not limited to N-vinylcaprolactam (NVC), N-vinyl pyrollidone (NVP), diacetone acrylamide, N-vinyl oxazolidinone or N-vinyl methoxazolidinone, N-vinyl carbazole, N-acryloxyoxyethylcyclohexanedicarboximide, N-vinyl imidazole, N-vinyl-N-methyl acetamide (VIMA) or acryloyl morpholine (ACMO). Vinyl ethers such as 2-(2-vinyloxyethoxy)ethyl(meth)acrylate (VEEA, VEEM); diethylene glycol divinyl ether (DVE2); triethylene glycol divinyl ether (DVE3); ethyl vinyl ether; n-butyl vinyl ether, iso-butyl vinyl ether; tert-butyl vinyl ether; cyclohexyl vinyl ether (CHVE); 2-ethylhexyl vinyl ether (EHVE); dodecyl vinyl ether (DDVE); octadecyl vinyl ether (ODVE); 1-2-butanediol divinyl ether (BDDVE); 1-4,cyclohexanedimethanol divinyl ether (CHDM-di); hydroxybutyl vinyl ether (HBVE); 1-4-cyclohexanedimethanolmono vinylether (CHDM-mono); 1,2,4-trivinylcyclohexane (TVCH); vinylphosphonic acid dimethylester (VPA); or vinylphosphonic acid dimethyl ester (VPADME).

As well as, or in place of, free radically-polymerisable monomers, any concentration and type of free-radically polymerisable oligomer, including but not restricted to polyurethane acrylates, polyester acrylates, polyether acrylates and epoxy acrylates may be used.

The ink and coating compositions of the invention typically comprise a total amount of polymerizable monomers and/or oligomers of about 30% (w/w) to about 95% (w/w), based on the total weight of the composition. For example, the total amount of polymerizable monomers and/or oligomers may be about 30% (w/w) to about 90% (w/w), based on the total weight of the composition; or about 30% to about 85%; or about 30% to about 80%; or about 30% to about 75%; or about 30% to about 70%; or about 30% to about 65%; or about 30% to about 60%; or about 30% to about 55%; or about 30% to about 50%; or about 30% to about 45%; or about 30% to about 40%; or about 30% to about 35%; or about 35% to about 95%; or about 35% to about 90%; or about 35% to about 85%; or about 35% to about 80%; or about 35% to about 75%; or about 35% to about 70%; or about 35% to about 65%; or about 35% to about 60%; or about 35% to about 55%; or about 35% to about 50%; or about 35% to about 45%; or about 35% to about 40%; or about 40% to about 95%; or about 40% to about 90%; or about 40% to about 85%; or about 40% to about 80% or about 40% to about 75%; or about 40% to about 70%; or about 40% to about 65%; or about 40% to about 60%; or about 40% to about 55%; or about 40% to about 50%; or about 40% to about 45%; or about 45% to about 95%; or about 45% to about 90%; or about 45% to about 85%; or about 45% to about 80%; or about 45% to about 75%; or about 45% to about 70%; or about 45% to about 65%; or about 45% to about 60%; or about 45% to about 55%; or about 45% to about 50%; or about 50% to about 95%; or about 50% to about 90%; or about 50% to about 85%; or about 50% to about 80%; or about 50% to about 75%; or about 50% to about 70%; or about 50% to about 65%; or about 50% to about 60%; or about 55% to about 95%; or about 55% to about 90%; or about 55% to about 85%; or about 55% to about 80%; or about 55% to about 75%; or about 55% to about 70%; or about 55% to about 65%; or about 60% to about 95%; or about 60% to about 90%; or about 60% to about 85%; or about 60% to about 80%; or about 60% to about 75%; or about 60% to about 70%; or about 60% to about 65%; or about 65% to about 95%; or about 65% to about 90%; or about 65% to about 85%; or about 65% to about 80%; or about 65% to about 75%; or about 65% to about 70%; or about 70% to about 95%; or about 70% to about 90%; or about 70% to about 85%; or about 70% to about 80%; or about 70% to about 75%; or about 75% to about 95%; or about 75% to about 90%; or about 75% to about 85%; or about 75% to about 80%; or about 80% to about 95%; or about 80% to about 90%; or about 80% to about 85%; or about 85% to about 95%; or about 85% to about 90%; or about 90% to about 95%.

The ink and coating compositions of the invention typically comprise about 1% (w/w) to about 95% (w/w) of any individual polymerizable monomer or oligomer, based on the total weight of the composition. For example, the amount of any individual polymerizable monomer or oligomer may be about 1% (w/w) to about 90% (w/w), based on the total weight of the composition; or about 1% to about 90%; or about 1% to about 85%; or about 1% to about 80%; or about 1% to about 75%; or about 1% to about 70%; or about 1% to about 65%; or about 1% to about 60%; or about 1% to about 55%; or about 1% to about 50%; or about 1% to about 45%; or about 1% to about 40%; or about 1% to about 35%; or about 1% to about 30%; or about 1% to about 25%; or about 1% to about 20%; or about 1% to about 15%; or about 1% to about 10%; or about 1% to about 5%; or about 5% to about 95%; or about 5% to about 90%; or about 5% to about 85%; or about 5% to about 80%; or about 5% to about 75%; or about 5% to about 70%; or about 5% to about 65%; or about 5% to about 60%; or about 5% to about 55%; or about 5% to about 50%; or about 5% to about 45%; or about 5% to about 40%; or about 5% to about 35%; or about 5% to about 30%; or about 5% to about 25%; or about 5% to about 20%; or about 5% to about 15% or about 5% to about 10%; or about 10% to about 95%; or about 10% to about 90%; or about 10% to about 85%; or about 10% to about 75%; or about 10% to about 70%; or about 10% to about 65%; or about 10% to about 60%; or about 10% to about 55%; or about 10% to about 50%; or about 10% to about 45%; or about 10% to about 40%; or about 10% to about 35%; or about 10% to about 30%; or about 10% to about 25%; or about 10% to about 20%; or about 10% to about 15%; or about 15% to about 95%; or about 15% to about 90%; or about 15% to about 85%; or about 15% to about 80%; or about 15% to about 75%; or about 15% to about 70%; or about 15% to about 65%; or about 15% to about 60%; or about 15% to about 55%; or about 15% to about 50%; or about 15% to about 45%; or about 15% to about 40%; or about 15% to about 35%; or about 15% to about 30%; or about 15% to about 25%; or about 15% to about 20%; or about 20% to about 95%; or about 20% to about 90%; or about 20% to about 85%; or about 20% to about 80%; or about 20% to about 75%; or about 20% to about 70%; or about 20% to about 65%; or about 20% to about 60%; or about 20% to about 55%; or about 20% to about 50%; or about 20% to about 45%; or about 20% to about 40%; or about 20% to about 35%; or about 20% to about 30%; or about 20% to about 25%; or about 25% to about 95%; or about 25% to about 90%; or about 25% to about 85%; or about 25% to about 80%; or about 25% to about 75%; or about 25% to about 70%; or about 25% to about 65%; or about 25% to about 60%; or about 30% (w/w) to about 90% (w/w), based on the total weight of the composition; or about 30% to about 85%; or about 30% to about 80%; or about 30% to about 75%; or about 30% to about 70%; or about 30% to about 65%; or about 30% to about 60%; or about 30% to about 55%; or about 30% to about 50%; or about 30% to about 45%; or about 30% to about 40%; or about 30% to about 35%; or about 35% to about 95%; or about 35% to about 90%; or about 35% to about 85%; or about 35% to about 80%; or about 35% to about 75%; or about 35% to about 70%; or about 35% to about 65%; or about 35% to about 60%; or about 35% to about 55%; or about 35% to about 50%; or about 35% to about 45%; or about 35% to about 40%; or about 40% to about 95%; or about 40% to about 90%; or about 40% to about 85%; or about 40% to about 80% or about 40% to about 75%; or about 40% to about 70%; or about 40% to about 65%; or about 40% to about 60%; or about 40% to about 55%; or about 40% to about 50%; or about 40% to about 45%; or about 45% to about 95%; or about 45% to about 90%; or about 45% to about 85%; or about 45% to about 80%; or about 45% to about 75%; or about 45% to about 70%; or about 45% to about 65%; or about 45% to about 60%; or about 45% to about 55%; or about 45% to about 50%; or about 50% to about 95%; or about 50% to about 90%; or about 50% to about 85%; or about 50% to about 80%; or about 50% to about 75%; or about 50% to about 70%; or about 50% to about 65%; or about 50% to about 60%; or about 50% to about 55%; or about 55% to about 95%; or about 55% to about 90%; or about 55% to about 85%; or about 55% to about 80%; or about 55% to about 75%; or about 55% to about 70%; or about 55% to about 65%; or about 55% to about 60%; or about 60% to about 95%; or about 60% to about 90%; or about 60% to about 85%; or about 60% to about 80%; or about 60% to about 75%; or about 60% to about 70%; or about 60% to about 65%; or about 65% to about 95%; or about 65% to about 90%; or about 65% to about 85%; or about 65% to about 80%; or about 65% to about 75%; or about 65% to about 70%; or about 70% to about 95%; or about 70% to about 90%; or about 70% to about 85%; or about 70% to about 80%; or about 75% to about 95%; or about 75% to about 90%; or about 75% to about 85%; or about 75% to about 80%; or about 80% to about 95%; or about 80% to about 90%; or about 80% to about 85%; or about 85% to about 95%; or about 85% to about 90%; or about 90% to about 95% about 25% to about 55%; or about 25% to about 50%; or about 25% to about 45%; or about 25% to about 40%; or about 25% to about 35%; or about 25% to about 30%; or about 30% to about 95%; or about 30% (w/w) to about 90% (w/w), based on the total weight of the composition; or about 30% to about 85%; or about 30% to about 80%; or about 30% to about 75%; or about 30% to about 70%; or about 30% to about 65%; or about 30% to about 60%; or about 30% to about 55%; or about 30% to about 50%; or about 30% to about 45%; or about 30% to about 40%; or about 30% to about 35%; or about 35% to about 95%; or about 35% to about 90%; or about 35% to about 85%; or about 35% to about 80%; or about 35% to about 75%; or about 35% to about 70%; or about 35% to about 65%; or about 35% to about 60%; or about 35% to about 55%; or about 35% to about 50%; or about 35% to about 45%; or about 35% to about 40%; or about 40% to about 95%; or about 40% to about 90%; or about 40% to about 85%; or about 40% to about 80% or about 40% to about 75%; or about 40% to about 70%; or about 40% to about 65%; or about 40% to about 60%; or about 40% to about 55%; or about 40% to about 50%; or about 40% to about 45%; or about 45% to about 95%; or about 45% to about 90%; or about 45% to about 85%; or about 45% to about 80%; or about 45% to about 75%; or about 45% to about 70%; or about 45% to about 65%; or about 45% to about 60%; or about 45% to about 55%; or about 45% to about 50%; or about 50% to about 95%; or about 50% to about 90%; or about 50% to about 85%; or about 50% to about 80%; or about 50% to about 75%; or about 50% to about 70%; or about 50% to about 65%; or about 50% to about 60%; or about 50% to about 55%; or about 55% to about 95%; or about 55% to about 90%; or about 55% to about 85%; or about 55% to about 80%; or about 55% to about 75%; or about 55% to about 70%; or about 55% to about 65%; or about 55% to about 60%; or about 60% to about 95%; or about 60% to about 90%; or about 60% to about 85%; or about 60% to about 80%; or about 60% to about 75%; or about 60% to about 70%; or about 60% to about 65%; or about 65% to about 95%; or about 65% to about 90%; or about 65% to about 85%; or about 65% to about 80%; or about 65% to about 75%; or about 65% to about 70%; or about 70% to about 95%; or about 70% to about 90%; or about 70% to about 85%; or about 70% to about 80%; or about 70% to about 75%; or about 75% to about 95%; or about 75% to about 90%; or about 75% to about 85%; or about 75% to about 80%; or about 80% to about 95%; or about 80% to about 90%; or about 80% to about 85%; or about 85% to about 95%; or about 85% to about 90%; or about 90% to about 95%.

Where the compositions of the present invention are used for applications requiring low migration it is preferred that the total concentration of monofunctional monomer is less than 15% (w/w), based on the total weight of the composition, preferably 10% (w/w), more preferably less than 5% (w/w), yet more preferably less than 2.5% (w/w), and most preferably essentially free of any monofunctional monomer.

Advantageously, including acids in the compositions of the invention does not negatively affect the conversion (curing) of monomers during the UV-curing process. This is important because, in addition to reduced amounts of migratable aldehydes, it is also necessary to minimize the amount of migratable monomers in the cured inks and coatings. Monomers that are cured do not migrate. It is the residual uncured monomers that can migrate from a cured ink or coating. Thus, cured inks and coatings of the present invention also have low levels of migratable monomers.

Where the compositions of the present invention require colorants, suitable colorants include, but are not limited to organic or inorganic pigments and dyes. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 138, 150, 155, 174, 180, 181, 188; Pigment Red Numbers 2, 22, 23, 48:1, 48:2, 52, 52:1, 53, 57:1, 112, 122, 166, 170, 176, 184, 202, 254, 266, 269; Pigment Orange Numbers 5, 16, 34, 36; Pigment Blue Numbers 15, 15:3, 15:4; Pigment Violet Numbers 3, 19, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The UV-curable compositions of the present invention may also contain other components which enable them to perform in their intended application. These other ink components include, but are not restricted to; stabilizers, wetting aids, slip agents, inert resins, antifoams, fillers, rheological aids, amine synergists, etc.

The compositions of the present invention may also optionally comprise any blend of acrylic polymer or copolymer which is dissolved into it. These polymers are usually prepared by the (thermal) free radical polymerization of blends of monomers including, but not restricted to, styrene, butyl (meth)acrylate, ethyl (meth)acrylate, methyl (meth)acrylate, or isobutyl (meth)acrylate. The acrylic polymer preferably has a number average molecular weight of less than 20,000 g/mole and more preferably less than 10,000 g/mole. The molecular weight of such polymers can be measured by those techniques known in the art such as gel permeation chromatography. Examples of acrylic polymers include those supplied from Dianal, Elvacite Rohm and Haas and DSM, amongst others. The acrylic polymer is preferably present in the compositions at a concentration of between 2 and 20% (w/w), based on the total weight of the composition.

Compositions of the present invention are preferably essentially free of any solvent. However, if required, compositions of the present invention can be diluted with solvents. Both organic and aqueous solvents may be used to dilute the curable compositions of the present invention. The preferred maximum amount of any solvent that could be included in an ink composition is 10% (w/w), based on the total weight of the composition.

The compositions prepared according to the present invention are particularly suited to the preparation of inkjet and flexographic printing inks and coatings. However, the compositions of the invention are also suitable for other types of printing, including, but not limited to, digital, offset, silk screen, lithographic, gravure, or letter press printing applications.

Low migration energy-curable compositions according to the present invention are preferably cured under the action of UV light. For low migration UV-curable compositions, it is preferred that photoinitiators having low migration potential are used. Any combination and concentration of low migration potential photoinitiators may be used and types include, but are not restricted to; polymeric, polymerisable, difunctional, multifunctional photoinitiators. Both type I and type II photoinitiators within those classes are suitable. Suitable polymeric photoinitiators have previously been described. Other photoinitiators suitable for low migration applications include, but are not limited to: 1-[4-(2-Hydroxyethoxy)-phenyl]-2-hydroxy-2-methyl-1-propane-1-one; oligo-[2-hydroxy-2-methyl-1-((4-(1-methylvinyl)phenyl) propanone]; poly(oxy-1,2-ethanediyl)-alpha-(4-(dimethylamino)benzoyl)-omega-((4-(dimethylamino) benzoyl)oxy)-(9Cl); 2-hydroxy-1-{4-[4-(2-hydroxy-2-methyl-propionyl)-benzyl]-phenyl}-2-methyl-propan-1-one; 2-hydroxy-1-[4-(4-(2-hydroxy-2-methylpropionyl) phenoxy)phenyl]-2-methyl propan-1-one; combinations thereof; and the like. Photoinitiators which are suitable for low migration may include any of those listed in EUPIA's 'Suitability List of Photo-initiators for Low Migration UV Printing Inks and Varnishes', especially those in Group 1A and 1B.

Any UV light source such as the following can be used; high-pressure mercury bulb, a medium-pressure mercury bulb, a xenon bulb, a carbon arc lamp, a metal halide bulb, a UV-LED lamp or sunlight, can be used. It should be appreciated by those skilled in the art that any UV light source may be used to cure compositions prepared according to the present invention.

Where UV-cured compositions are applied to the (non-contact) surface of primary or secondary packaging intended for foodstuffs, then any contamination from the package impacting the foodstuff should preferably fall within the guidelines set out by Article 3 of Regulation (EC) No. 1935/2004 (and also EC No. 10/2011), as recommended by EUPIA (European Printing Ink Association), requiring that materials and articles in contact with food "shall be manufactured in accordance with the good manufacturing practices, so that under normal or foreseeable conditions of use, they do not transfer their constituents to food in quantities which could endanger human health, bring about an unacceptable change in the composition of the food, or bring about a deterioration in the organoleptic characteristics thereof."

EUPIA has recommended that Article 3 of this provision be followed when producing printed matter for food packaging and has produced a detailed guideline for the selection of raw materials intended for printing inks for food packaging, along with guidelines on the testing of printed matter to ensure that regulatory requirements are achieved. Where no specific migration limit (SML) exists for a specific component then the following migration limits apply: 10 ppb, in case of insufficient toxicological data; 50 ppb if three negative mutagenicity testes requested by EFSA4 Guideines are available; above 50 ppb, if supported by favorable toxicological data and/or evaluation done in accordance with the EFSA Guidelines (Extract from EuPIA Guideline on Printing Inks applied to the non-food contact surface of food packaging materials and articles, September 2009).

EUPIA also provides guidelines on how to measure the potential level of migratables arising from printed matter. For inks and coatings applied to the non-food contact surface of packaging (i.e. the outer surface), whether that be to the primary packaging or secondary packaging (labels and sleeves) then the most likely route for migratable species from the ink contaminating the foodstuff is by what is known as set-off migration. This is where printed matter is stacked or reeled prior to it being filled with food. Thus, the ink on the printed side of the substrate comes into contact with what will be the food-contact surface of the package (i.e. the unprinted side) and migratable components of the ink can diffuse into this surface. When the package is then filled with foodstuff, the contaminants from the ink which have diffused into the contact-surface of the package can then leach into the food causing a potential contamination issue. Thus, any energy-curable fluid which is applied to either the primary or secondary packaging of foodstuff should not result in contamination of that foodstuff at levels exceeding the limits detailed above.

EXAMPLES

The following examples illustrate specific aspects of the present invention, and are not intended to limit the scope thereof in any respect and should not be so construed.
Methods
Ink Preparation The inks were prepared by mixing the ink components using a Silverson type disperser for 20 minutes. The inks are suitable for inkjet printing and were prepared according to the principles laid out in WO 2014/126720, based on difunctional acrylate monomers and a low migration photoinitiator package comprising a limited concentration of polymeric photoinitiator.
Viscosity Measurements The viscosity of the inks was measured at 45° C. using a Brookfield DV-II+ Pro Viscometer equipped with Spindle no. 18, at 100 rpm. Viscosity is reported as mPa·s.
Curing the Inks for Extraction Testing The inks were applied to 36 μm Melinex S (a polyester film) at a thickness of 12 μm and then cured at 200 mJ/cm$^2$, using a Fusion UV Systems UV-Rig equipped with a medium pressure H-bulb. The belt speed was adjusted to deliver the required UV-dose of 200 mJ/cm$^2$, as measured by a calibrated International Light Technologies ILT 490 Profiling Belt Radiometer (covering the UV-A and UV-B ranges).

Alternatively, and where indicated below, after being applied to the substrate, the inks were cured using a UV-LED lamp. The inks were cured at 395 nm, with a belt speed of 30 m/min, with a 12 W/cm$^2$ Phoseon Firejet 200 UV-LED (395 nm) lamp at full power.
Assessing the Level of Extractable Photoinitiator Residues and Monomers To determine the effectiveness of an acid or PAG to reduce the amount of mesitaldehyde or other aldehyde emitted by an acylphosphine oxide photoinitiator during UV-curing, a 'total extraction' test was employed. This test involved soaking 30 cm$^2$ of the print in 2 ml of methanol, containing 0.025% (w/w) of hydroquinone monomethyl ether (MEHQ; stabilizer) for 24 hours at room temperature before the methanol solution was analyzed by GC-MS. The GC-MS was calibrated with known solutions of the photoinitiator products and monomers and the results are reported as ppb (parts per billion), the equivalent amount of monomer, or photoinitiator fragment, that would be present in 1 Kg of food according to the EU packaging model (where it is assumed that 600 cm$^2$ of substrate is required to package 1 Kg of food) if all the unbound monomer in the print were to migrate into and contaminate the food.

Example 1. UV-Curable Inkjet Compositions Comprising Photoacid Generators (PAGs)

Inventive inks 1 to 11, and comparative ink 1 were prepared as pigmented ink compositions according to the compositional guidelines shown in Table 1.

TABLE 1

| Formulation guidelines | |
|---|---|
| Material: | % (w/w) |
| VEEA | 22.0 |
| 3-MePDDA | 30.0 |
| DPGDA | 4.5-6.5 |
| PEG300DA | 6.0 |
| DiTMPTA | 7.5 |
| Acrylated Amine | 2.5 |
| Irgacure 819 | 2.5 |
| KIP160 | 1.5 |
| Irgacure 127 | 1.5 |
| Omnipol TX | 1.5 |
| PAG | 0-2.0 |
| Irgastab UV 25 | 1.0 |
| Yellow Dispersion | 17.5 |

Notes:
VEEA = 2-(2-vinyloxyethoxy)ethyl acrylate
3-MePDDA = 3-Methylpentanediol diacrylate
DPGDA = Dipropylene glycol diacrylate
PEG300DA = Poly(ethylene glycol 300) diacrylate
Acrylated Amine = Photomer 4771
Irgacure 819 = acylphosphine oxide photoinitiator (ex. IGM); Bis(2,4,6-trimethylbenzoyl)-phenylphosphineoxide
Esacure KIP160 = α-hydroxyketone photoinitiator (ex. Lamberti)
Irgacure 127 = α-hydroxyketone photoinitiator (ex. Lamberti)
Omnipol TX = Polymeric Thioxanthone Photoinitiator (ex. IGM Resins)
Irgastab UV25 = In-can stabilizer, ex. BASF
Yellow Dispersion = a dispersion containing 19.0% (w/w) of Pigment Yellow 180, the remainder comprising the dispersant (Efka PX4701), stabilizers and DPGDA The PAGs used were the following:
(a) Triphenylsulfonium hexafluorophosphate
(b) 4,4'-dimethyl-diphenyl iodonium hexafluorophosphate (c) Bis-(4,4-dodecylphenyl)-iodoniumhexafluorophosphate (d) (4-phenylthiophenyl)diphenylsulphonium triflate (e) 1-{4-[(4-benzoylphenyl)sulfanyl]phenyl}-2-methyl-2-[(4-methylphenyl)sulfonyl]propan-1-one Table 2 provides the details of the PAG used and its concentration, along with the amount of mesitaldehyde detected in the total extracts analysis. The examples in Table 2 were made according to the formulation guidelines in Table 1 with % of PAG adjusted in each example by adjusting the % of DPGDA, such that the total formula equaled 100% (w/w). The inks were cured using a Fusion UV Systems UV-Rig equipped with a medium pressure H-bulb. For all examples "Comp." means that the example is comparative; and "Inv." means that the example is a composition of the present invention.

TABLE 2

PAG type and concentration effect on mesitaldehyde emission

| Example | PAG | Extractable Mesitaldehyde (ppb) | Reduction in Mesitaldehyde (%) |
|---|---|---|---|
| Comp. Ex. 1 | None | 68.0 | — |
| Inv. Ex. 1 | 0.5% (b) | 50.5 | 26 |
| Inv. Ex. 2 | 1.0% (b) | 37.5 | 45 |
| Inv. Ex. 3 | 1.5% (b) | 11.5 | 83 |
| Inv. Ex. 4 | 2.0% (b) | 5.0 | 93 |
| Inv. Ex. 5 | 1.5% (a) | 6.0 | 91 |
| Inv. Ex. 6 | 1.5% (c) | 41.0 | 40 |
| Inv. Ex. 7 | 1.5% (d) | 16.5 | 76 |
| Inv. Ex. 8 | 0.25% (e) | 49.0 | 28 |
| Inv. Ex. 9 | 0.5% (e) | 38.0 | 44 |
| Inv. Ex. 10 | 1.0% (e) | 27.0 | 60 |
| Inv. Ex. 11 | 1.5% (e) | 12.0 | 82 |

It is clear from the data in Table 2 that all the PAGs produced a significant reduction in the amount of mesitaldehyde produced from the photodecomposition of the acylphosphine oxide photoinitiator bis(2,4,6-trimethylbenzoyl)-phenylphosphineoxide. Reductions of 25% and greater were observed with concentrations of PAG in the ink down to 0.25% (w/w).

To show that incorporating the PAG did not have a detrimental impact on the conversion of monomer during UV-curing, the amount of extractable monomer was also determined for the examples. The data for the amount of extractable monomers are shown in Table 3.

TABLE 3

Amount of extractable monomer for inkjet compositions comprising PAGs

| Example | Extractable DPGDA (ppb) | Extractable 3-MePDDA (ppb) | Extractable VEEA (ppb) |
|---|---|---|---|
| Comp. Ex 1 | 7.0 | 4.0 | 3.0 |
| Inv. Ex. 1 | 6.0 | 4.0 | 2.0 |
| Inv. Ex. 2 | 8.0 | 5.0 | 3.5 |
| Inv. Ex. 3 | 3.0 | 2.5 | 2.0 |
| Inv. Ex. 4 | 7.0 | 8.0 | 5.5 |
| Inv. Ex. 5 | 3.5 | 3.0 | 2.0 |
| Inv. Ex. 6 | 4.0 | 4.5 | 1.5 |
| Inv. Ex. 7 | 7.5 | 8.0 | 5.5 |
| Inv. Ex. 8 | ND | ND | ND |
| Inv. Ex. 9 | ND | ND | ND |
| Inv. Ex. 10 | ND | ND | ND |
| Inv. Ex. 11 | 4.0 | 2.0 | <1.0 |

ND—not determined

It is evident from the data in Table 3 that the introduction of the PAGs into the inkjet compositions had no detrimental impact on the amount of uncured monomer that can be extracted from a UV-cured ink film.

To demonstrate that it is the generation of the acid during the UV-curing process that is key in causing the reduction in mesitaldehyde production from bis(2,4,6-trimethylbenzoyl)-phenylphosphineoxide, the compositions described in Table 4a were cured with a UV-LED lamp as described above.

TABLE 4a

Formulation UV-LED curable inkjet compositions

| Material | Comp. Ex. 2 | Inv. Ex. 10a |
|---|---|---|
| VEEA | 30.0 | 30.0 |
| 3-MePDDA | 30.0 | 30.0 |
| DPGDA | 6.0 | 5.0 |
| DiTMPTA | 5.0 | 5.0 |
| Aminoacrylate | 10.0 | 10.0 |
| Irgacure 819 | 5.0 | 5.0 |
| Omnipol TX | 3.0 | 3.0 |
| PAG (e) | — | 1.0 |
| Tegorad 2200 | 2.0 | 2.0 |
| Cyan Dispersion | 9.0 | 9.0 |
| Total | 100.0 | 100.0 |

Notes to Table 4a:
Tegorad 2200 = Silicone polyether acrylate, ex. Evonik
Cyan Dispersion = A dispersion containing 25.0% (w/w) of Pigment Cyan 15:4, the remainder comprising the dispersant, stabilizers and DPGDA.

The properties of the UV-LED curable inkjet compositions described in Table 4a are shown in Table 4b.

TABLE 4b

Properties of UV-LED curable inkjet compositions

| Material | Comp. Ex. 2 | Inv. Ex. 10a |
|---|---|---|
| Viscosity at 45° C. (mPa · s) | 9.36 | 9.63 |
| Extractable Mesitaldehyde (ppb) | 190 | 200 |

The data in Table 4b show that the introduction of 1-{4-[(4-benzoylphenylsulfanyl]phenyl}-2-methyl-2-[(4-methylphenyl)sulfonyl]propan-1-one (i.e. PAG (e)) does not produce any reduction in the amount of mesitaldehyde produced by the acylphosphine oxide photoinitiator during UV-curing under the action of a 395 nm UV-LED lamp. The most probable reason for this is that PAG (e) has negligible UV absorption at 395 nm, and hence will not produce any effective amount of photoacid to mitigate the emission of mesitaldehyde during UV-cure. This is an important finding as it lends confirmation to the need for an acid to induce the observed reduction in mesitaldehyde produced by the acylphosphine oxide photoinitiator during UV-cure. Note that while Inv. Ex. 10a is not suitable for LED curing, it would be suitable if cured by conventional UV radiation not specifically in the UV-LED range.

To confirm that this effect is applicable to other colours, inkjet inks were prepared according to Comp. Ex. 1, and Inv. Ex. 3 and Inv. Ex. 11, but using cyan, magenta and black pigment dispersions in place of the yellow dispersion. The cyan dispersion was the same as used in Comparative Example 2 and the inks contained 9.0% (w/w) of this dispersion. The magenta dispersion contained 21% (w/w) of Pigment Red 122, the remainder comprising the dispersant, stabilizers and DPGDA; 17.5% of this dispersion was used to prepare the inks. The black dispersion contained 25% (w/w) of Pigment Black 7, the remainder comprising the dispersant, stabilizers and DPGDA; 7.5% of this dispersion was used to prepare the inks. The content of the DPGDA and 3-MePDDA in the inks was adjusted to allow for the incorporation of the pigment dispersions into the inks, the rest of the composition being identical to Comp. Ex. 1.

Table 5 shows the effect of incorporation of 1.5% PAG (b) or PAG (e) into the cyan, magenta, and black inkjet inks on the amount of extractable mesitaldehyde produced by the acylphosphine oxide photoinitiator during UV-cure. The inks were cured in the same manner as Comp. Ex. 1.

TABLE 5

Extractable mesitaldehyde from cyan, magenta, and black inkjet compositions

|  | Color | PAG | Extractable Mesitaldehyde (ppb) | Reduction in Mesitaldehyde (%) |
|---|---|---|---|---|
| Comp. Ex. 3 | Cyan | None | 74.0 | 0 |
| Inv. Ex. 12 | Cyan | 1.5% PAG (b) | 9.5 | 87 |
| Inv. Ex. 13 | Cyan | 1.5% PAG (e) | 45.0 | 39 |
| Comp. Ex. 4 | Magenta | None | 77.0 | 0 |
| Inv. Ex. 14 | Magenta | 1.5% PAG (b) | 7.5 | 90 |
| Inv. Ex. 15 | Magenta | 1.5% PAG (e) | 35.0 | 55 |
| Comp. Ex. 5 | Black | None | 38.0 | 0 |
| Inv. Ex. 16 | Black | 1.5% PAG (b) | 6.0 | 84 |
| Inv. Ex. 17 | Black | 1.5% PAG (e) | 23.0 | 39 |

The results in Table 5 clearly show that the two photoacid generators, 4,4'-dimethyl-diphenyl iodonium hexafluorophosphate (b) and 1-{4-[(4-benzoylphenyl)sulfanyl]phenyl}-2-methyl-2-[(4-methylphenyl) sulfonyl]propan-1-one (e), are effective in reducing the amount of mesitaldehyde produced from bis(2,4,6-trimethylbenzoyl)-phenylphosphineoxide during UV-cure under a medium pressure H-bulb. The significant reductions in aldehyde generated during UV-cure undoubtedly reduces any risk associated with the migration and pursuant contamination associated with the aldehyde.

Example 2. UV-Curable Inkjet Compositions Comprising Organic Acids

To show that the aldehyde lowering effect of the present invention is not just possible with a photoacid generator, a series of inks were prepared containing conventional organic acids.

A series of inks were prepared generally according to the formulation described in Table 1, but rather than using a PAG, these (yellow) inks comprised organic acids. The following organic acids were used: 2-acrylamido-2-methyl-1-propanesulfonic acid (AMPS); 2-hydroxyethylmethacrylate acid phosphate (HEMAP); and UE9100, a carboxylic acid-functional epoxy acrylate resin solution, (ex. DIC) having an acid value of 55 mgKOH/g. All these materials are polymerisable as they comprise ethylenically unsaturated groups. It should be noted that the present invention covers any other organic acid, including both polymerisable and non-polymerisable types, and also inorganic acids. The inks were cured using a Fusion UV Systems UV-Rig as described above. The type and amount of organic acid, and the amount of extractable mesitaldehyde, are shown in Table 6.

TABLE 6

Organic acid type and concentration effect on extractable mesitaldehyde

|  | Organic Acid | Extractable Mesitaldehyde (ppb) | Reduction in Mesitaldehyde (%) |
|---|---|---|---|
| Comp. Ex. 1 | None | 68.0 | 0 |
| Inv. Ex. 18 | 1.5% AMPS | 52.0 | 24 |
| Inv. Ex. 19 | 3.0% AMPS | 45.0 | 34 |
| Inv. Ex. 20 | 1.5% HEMAP | 33.0 | 51 |
| Inv. Ex. 21 | 3.0% HEMAP | 12.0 | 82 |
| Inv. Ex. 22 | 5.0% UE9100 | 43.0 | 37 |
| Inv. Ex. 23 | 10.0% UE9100 | 44.0 | 35 |

Table 6 shows that the incorporation of conventional acids, rather than PAGs, into UV-curable compositions comprising acylphosphine oxide photoinitiators also has the capacity to induce a lowering of the amount of aldehyde produced from the acylphosphine oxide photoinitiator during UV-cure. This is an important finding because many of the PAGs are not suitable for low migration printing and coating applications. Furthermore, the PAGs used here do not absorb UV light effectively at the longer wavelengths typical of UV-LED lamps, especially of 360 nm and higher (although the use of suitable sensitizers, as previously described, would enable this). Thus, the use of conventional acids, and especially of organic acids, would be especially favored. It should be reiterated that of the identified relevant prior art, the capacity of the addition of acids to UV-curable inks comprising acylphosphine oxide photoinitiators to reduce the amount of aldehyde produced has not been disclosed. As such, the present invention is highly beneficial in the area of low migration printing and coating of UV-curable compositions, and especially of food packaging.

Example 3. Additional Examples Showing Reduction of Migratable Mesitaldehyde Under UV-LED Cure Example 10a showed that when an ink composition comprising PAG (e), without any sensitizer, was cured under the action of a UV-LED source, there was no observable reduction in the amount of mesitaldehyde produced. As explained above, this was ascribed to PAG (e) not being able to produce any photoacid at the higher wavelength of the UV-LED light source.

To demonstrate that reduction of mesitaldehyde production is possible under the action of UV-LED, inks according to the formulation in Table 7a were prepared. The printed inks were cured using UV-LED.

TABLE 7a

Formulation of UV-LED curable inkjet compositions

|  | Comp. Ex. 6 | Inv. Ex. 24 | Inv. Ex. 25 |
|---|---|---|---|
| VEEA | 25.0 | 25.0 | 25.0 |
| 3-MePDDA | 25.0 | 25.0 | 25.0 |
| DPGDA | 17.0 | 15.0 | 13.0 |
| DiTMPTA | 5.0 | 5.0 | 5.0 |
| Aminoacrylate | 4.0 | 4.0 | 4.0 |
| TMP(EO15)TA | 7.5 | 7.5 | 7.5 |
| Irgacure 819 | 2.5 | 2.5 | 2.5 |
| Omnipol TX | 5.0 | 5.0 | 5.0 |
| PAG (a) | — | 2.0 | — |
| HEMAP | — | — | 4.0 |
| Cyan Dispersion | 9.0 | 9.0 | 9.0 |
| Total | 100 | 100 | 100 |

Notes:
TMP(EO15)TA = trimethylolpropane triacrylate having 15 moles of ethoxylation Table 7b shows the amount of extractable mesitaldehyde in these inks.

TABLE 7b

Properties of UV-LED curable inkjet compositions

|  | Comp. Ex. 6 | Inv. Ex. 24 | Inv. Ex. 25 |
|---|---|---|---|
| Viscosity at 45° C. (mPa · s) | 8.70 | 9.09 | 9.81 |
| Extractable Mesitaldehyde (ppb) | 155 | 13.0 | 16.5 |
| Reduction in Mesitaldehyde (%) | — | 92 | 89 |

Iodonium salts of the PAG (a) type are known to be sensitized by thioxanthone type photoinitiators (e.g. Omnipol TX). This probably accounts for the significant lowering of the mesitaldehyde observed with Inv. Ex. 24, compared with Comp. Ex. 6, when cured under the action of a UV-LED light source. Thus, the action of the polymeric thioxanthone is to sensitize PAG (a) to produce the required acid, when exposed to the light produced by the UV-LED light source. The acid generated induces the lowering of the amount of mesitaldehyde produced during UV-cure. The organic acid HEMAP, which does not rely on the generation of a photoacid to be effective, is again shown to be highly effective in reducing the amount of mesitaldehyde.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. An energy curable ink or coating composition, comprising:
   a) one or more photopolymerizable monomers and/or oligomers;
   b) one or more acylphosphine oxide photoinitiators, selected from the group consisting of bis(2,4,6-trimethylbenzoyl)-phenylphosphineoxide; bis(2,6-dimethoxybenzoyl)-2,4,4-trimethylpentylphosphinoxide; diphenyl(2,4,6-trimethylbenzoyl)phosphine oxide; ethyl (2,4,6-trimethylbenzoyl) phenylphosphinic acid, P-(3-benzoyl-2,4,6-trimethylbenzoyl)-P-phenyl-, ethyl ester; and combinations thereof; and
   c) one or more acids;
   wherein the composition comprises less than 10% (w/w) of monofunctional monomers, based on the total weight of the composition;
   wherein the one or more acids do not inhibit polymerization; and
   wherein:
   i. during UV-curing, the acylphosphine oxide photoinitiator produces one or more decomposition products;
   ii. at least one decomposition product is an aldehyde; and
   iii. the amount of aldehyde decomposition products is reduced, compared to a similar composition containing an acylphosphine oxide photoinitiator but no acid, by an amount according to the following equation:

$X = 100 \times ((AD_0 - AD_a)/AD_0) \geq 10.00$ wherein
   X is the percent reduction of decomposition products;
   $AD_0$ is the amount of decomposition products produced during UV-cure of the composition containing an acylphosphine oxide photoinitiator, but without the acid; and
   $AD_a$ is the amount of decomposition products produced during UV-cure of the composition containing an acylphosphine oxide photoinitiator and an acid.

2. The composition of claim 1, wherein at least one acid is an organic acid; and/or wherein at least one acid is produced by a photoacid generator upon UV irradiation.

3. The composition of claim 2, wherein the organic acid is selected from the group consisting of a phosphoric acid, phosphoric acid derivatives, sulphonic acid, sulphonic acid derivatives, carboxylic acid derivatives, and combinations thereof.

4. The composition of claim 2, wherein the organic acid further comprises one or more acrylate, methacrylate, vinyl, or acrylamide groups.

5. The composition of claim 2, wherein the photoacid generator is a cationic photoinitiator or a ketosulphone photoinitiator.

6. The composition of claim 5, wherein the cationic photoinitiator is a sulphonium salt or an iodonium salt; and/or wherein the ketosulphone photoinitiator is 1-{4-[(4-benzoylphenyl)sulfanyl]phenyl}-2-methyl-2-[(4-methylphenyl)sulfonyl]propan-1-one.

7. The composition of claim 5, wherein the photoacid generator derived acid is selected from the group consisting of $HPF_6$ (hexafluorophosphoric acid), $HSbF_6$ (hexafluoroantimonic acid), $HAsF_6$ (hexafluoroasenic acid), $HB(C_6F_5)_4$ (tetrakis(pentafluorophenyl)boronic acid), toluenesulphonic acid, and combinations thereof.

8. The composition of claim 1, further comprising a UV sensitizer.

9. The composition of claim 8, wherein the UV sensitizer is selected from the group consisting of any thioxanthone, anthracene, naphthalenes, and perylene, or combinations thereof.

10. The composition of claim 9, wherein the thioxanthone sensitizer is selected from any which is suitable for low migration application.

11. The composition of claim 10, wherein the thioxanthone sensitizer is multifunctional, polymeric, or polymerizable.

12. The composition of claim 1, wherein the acylphosphine oxide photoinitiator is present in an amount of 0.1% (w/w) to 10% (w/w), based on the total weight of the composition; and/or wherein when at least one acid is an organic acid, the organic acid is present in an amount of 0.1% (w/w) to 10% (w/w), based on the total weight of the composition; and/or wherein when at least one acid is produced by a photoacid generator, the photoacid generator is present in an amount of 0.1% (w/w) to 10% (w/w), based on the total weight of the composition; and/or wherein the total amount of all photopolymerizable monomers and/or oligomers in the composition are present in an amount of 30% (w/w) to 95% (w/w), based on the total weight of the composition.

13. The composition of claim 1, wherein individual species of photopolymerizable monomers and/or oligomers are each independently present in an amount of 1% (w/w) to 95% (w/w), based on the total weight of the composition.

14. A method for preparing a printed substrate having a reduced amount of extractable materials, comprising applying one or more ink or coating compositions of claim 1 to the substrate, and curing the ink or coating compositions under the actions of UV radiation.

15. A printed substrate prepared by the method of claim 14.

16. An article comprising the printed substrate of claim 15.

17. A method for preparing an article with a low migration ink or coating thereon, comprising applying one or more ink or coating compositions of claim 1, and curing the composition under the action of UV light.

18. The composition of claim 1, wherein at least one acid is produced by photoacid generator, wherein the photoacid generator is a ketosulphone photoinitiator.

19. The composition of claim 18, wherein the ketosulphone photoinitiator is 1-{4-[(4-benzoylphenyl)sulfanyl]phenyl}-2-methyl-2-[(4-methylphenyl)sulfonyl]propan-1-one.

20. The composition of claim 1, wherein at least one acid is an organic acid.

21. The composition of claim 20, wherein at least one organic acid is a sulphonic acid, sulphonic acid derivative, or a combination thereof.

* * * * *